(12) United States Patent
Masuda et al.

(10) Patent No.: US 12,151,163 B2
(45) Date of Patent: Nov. 26, 2024

(54) STORAGE MEDIUM, INFORMATION PROCESSING APPARATUS, INFORMATION PROCESSING SYSTEM AND GAME PROCESSING METHOD

(71) Applicants: Nintendo Co., Ltd., Kyoto (JP); The Pokémon Company, Tokyo (JP)

(72) Inventors: Junichi Masuda, Tokyo (JP); Yuichi Ueda, Tokyo (JP)

(73) Assignees: NINTENDO CO., LTD., Kyoto (JP); THE POKÉMON COMPANY, Tokyo (JP)

( * ) Notice: Subject to any disclaimer, the term of this patent is extended or adjusted under 35 U.S.C. 154(b) by 213 days.

(21) Appl. No.: 17/882,604

(22) Filed: Aug. 8, 2022

(65) Prior Publication Data

US 2023/0057252 A1 Feb. 23, 2023

(30) Foreign Application Priority Data

Aug. 17, 2021 (JP) ................. 2021-132780

(51) Int. Cl.
*A63F 13/52* (2014.01)
*A63F 13/537* (2014.01)

(52) U.S. Cl.
CPC ............ *A63F 13/52* (2014.09); *A63F 13/537* (2014.09)

(58) Field of Classification Search
CPC ......... A63F 13/52; A63F 13/55; A63F 13/537
See application file for complete search history.

(56) References Cited

U.S. PATENT DOCUMENTS

| | | | |
|---|---|---|---|
| 10,452,896 B1 * | 10/2019 | Weise | G06T 13/40 |
| 2002/0024517 A1 | 2/2002 | Yamaguchi et al. | |
| 2008/0309677 A1 * | 12/2008 | Fleury | G06T 19/00 345/619 |

(Continued)

FOREIGN PATENT DOCUMENTS

| | | |
|---|---|---|
| JP | 2002-058045 | 2/2002 |
| JP | 2008-071271 | 3/2008 |

(Continued)

OTHER PUBLICATIONS

Mii Creation, Jan. 16, 2007, Youtube.com, 2007, pp. 1-12, at https://www.youtube.com/watch?v=bYm7IEYu42k (last visited May 2, 2024. (Year: 2007).*

(Continued)

*Primary Examiner* — Steve Rowland
(74) *Attorney, Agent, or Firm* — Nixon & Vanderhye, PC

(57) ABSTRACT

An example of an information processing system displays a character based on a character model of a first type in a first scene in the game, and based on a character model of a second type in a second scene. In a third scene, a wearable item is selected in response to a selection instruction. In the third scene, the character based on the character model of the first type having the appearance of wearing the selected wearable item is displayed, and the character based on the character model of the second type having the appearance of wearing the wearable item is displayed. When a confirm instruction is given, settings regarding the appearance of the character are changed so as to reflect the wearable item on the appearance of the character in the first scene and the second scene.

32 Claims, 19 Drawing Sheets

(56) References Cited

U.S. PATENT DOCUMENTS

| | | | | |
|---|---|---|---|---|
| 2009/0079743 | A1* | 3/2009 | Pearson | G06T 13/20 345/473 |
| 2017/0053642 | A1* | 2/2017 | Yamamoto | G10L 13/033 |
| 2017/0312634 | A1* | 11/2017 | Ledoux | A63F 13/655 |
| 2019/0339847 | A1* | 11/2019 | Scapel | G06T 13/80 |
| 2020/0410575 | A1* | 12/2020 | Grantham | G06T 19/20 |
| 2021/0187396 | A1 | 6/2021 | Sakamoto | |
| 2021/0312684 | A1* | 10/2021 | Zimmermann | G02B 27/01 |
| 2021/0316215 | A1* | 10/2021 | Sensui | A63F 13/533 |

FOREIGN PATENT DOCUMENTS

| | | |
|---|---|---|
| JP | 2008-272124 | 11/2008 |
| JP | 2021-100470 A | 7/2021 |

OTHER PUBLICATIONS

[#MHW Trivia] You can try it on when producing equipment!, YouTube [online] [video], Feb. 23, 2018, [Searched on Dec. 27, 2023], URL: https://www.youtube.com/watch?v=u8YyiprE37w, See video time [00:00]-[00:17], pp. 1-9.

Jan. 5, 2024 Office Action issued in Japanese Patent Application No. 2021-132780, pp. 1-5 [machine translation included].

Phi, [Arknights] Summary of change of the fashion and method of acquisition of fashion. Double your operator's charm by changing clothing!, APPBANK [online], Jan. 18, 2020, [Search date: Sep. 7, 2023], URL:https://www.appbank.net/2020/01/18/iphone-application/1846847.php; especially refer to "■Step 2 Change into clothing you got!"

You should know original FF7 before FF7 Remake [controversial story], Game Research Institute [online], Mar. 2021, [Search date: Sep. 7, 2023], URL:https://donblog.net/ff7-3066.html; especially refer to "Change of image expressions".

Professor Tsutsumi, [Animation included] "Monster Hunter : World" Play Report Part 1, A lot of attention to the that has evolved to be easier to play! (1/2), Famitsu.com [online], Nov. 2, 2017, [Search date: Sep. 7, 2023], https://www.famitsu.com/news/201711/02144956.html; especially refer to the column "Professor".

Sep. 13, 2023 Office Action issued in Japanese Patent Application No. 2021-132780, pp. 1-5 [machine translation included].

Notice of Reasons for Refusal issued on May 21, 2024 for Japanese Patent Application No. 2021-132780 (with translation), 13 pages.

[Azur Lane] Z46 Live2D "Idol" Costume Change, Youtube [online] [video], Nov. 8, 2020, Internet: <URL:https://www.youtube.com/watch?v=Cy81tdrFchw> [Search date: May 15, 2024] Youtube Channel: Aria Yuna.

Story and Setting, Let's change into your favorite clothes and change your hairstyle, Pocket Monsters Sword and Shield Official Website [Online], Internet: <URL:https://www.pokemon.com/ex/sword_shield/story/190905_01.html [Search date: May 15, 2024].

* cited by examiner

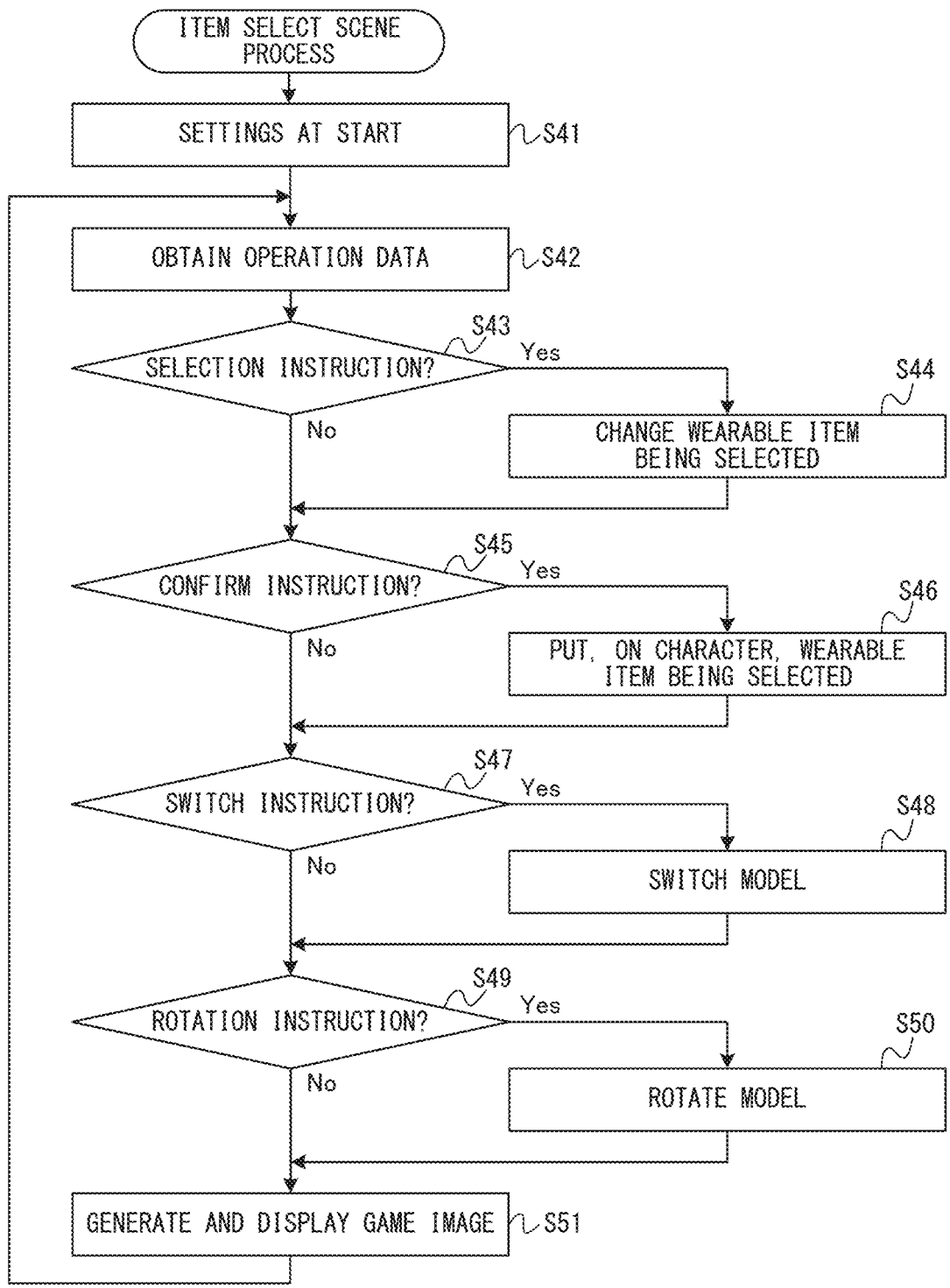

STORAGE MEDIUM, INFORMATION PROCESSING APPARATUS, INFORMATION PROCESSING SYSTEM AND GAME PROCESSING METHOD

CROSS REFERENCE TO RELATED APPLICATION

This application claims priority to Japanese Patent Application No. 2021-132780, filed on Aug. 17, 2021, the entire contents of which are incorporated herein by reference.

FIELD

The present disclosure relates to a storage medium for displaying characters in a virtual space, an information processing apparatus, an information processing system and a game processing method.

BACKGROUND AND SUMMARY

There have been conventional techniques that allow a game character to change items, such as garments, armors, etc., that the game character is wearing. With such techniques, the appearance of the game character may be changed in accordance with the item or items being worn.

On the other hand, a game character may be displayed using different types of models (e.g., two types of models: a standard model and a deformed model with a smaller head-height ratio than the standard model). In such cases, for each of the various types of models, the appearance of the game character was not changed in accordance with the item or items worn by the game character.

Therefore, the present application discloses a storage medium, an information processing apparatus, an information processing system and a game processing method, with which it is possible, where different types of models are used for each character, to change the appearance of the character in accordance with the item or items worn by the character.

(1)

An example of a storage medium described herein stores a game program that causes a computer of an information processing apparatus to perform the following processes.

displaying a character based on a character model of a first type in a first scene in a game.
    displaying the character based on a character model of a second type different from the first type in a second scene different from the first scene in the game.

In a third scene in the game, in which the user is allowed to specify a wearable item for changing appearance of the character, the game program causes the computer of the information processing apparatus to perform the following processes.

selecting a wearable item in response to a selection instruction based on an operation input by the user.
    performing a first preview display in which the character is displayed based on the character model of the first type having the appearance of wearing the wearable item being selected.
    performing a second preview display in which the character is displayed based on the character model of the second type having the appearance of wearing the wearable item being selected.

If a confirm instruction has been given based on an operation input by the user, the game program causes the computer of the information processing apparatus to change settings regarding appearance of the character so as to reflect the wearable item being selected on the appearance of the character in the first scene and the second scene.

With configuration (1) above, where two different models are used for a character, the appearance of the character can be changed in accordance with the wearable item for each of the models of different types. Moreover, since the preview is displayed for both of the two different character models, the user can check the appearance for both of the two different models.

(2)

The character model of the first type and the character model of the second type may be three-dimensional models having different head-height ratios from each other.

With configuration (2) above, for each of the two different models having different head-height ratios, the appearance of the character can be changed in accordance with the wearable item, and the user can check the preview.

(3)

The character may be a player character that is controlled by the user. The first scene may be a scene in which the character moves through the game field. The second scene may be a scene, switched from the first scene, in which a battle or an event is performed by the character. The character model of the first type may have a lower head-height ratio than the character model of the second type.

With configuration (3) above, it is possible to render the character with more details by using a character model having a high head-height ratio in a scene where a battle or an event is performed, while reducing the process load by using a character model having a low head-height ratio in a scene where the character moves through the field.

(4)

The game program may cause the computer to perform: controlling movement of the character through the game field based on an operation input by the user in the first scene; and controlling a predetermined action of the character not based on an operation input by the user in the second scene.

With configuration (4) above, in a scene where a battle or an event is performed, a predetermined action by the character can be shown to the user in an easy-to-understand manner by using a model having a high head-height ratio.

(5)

The wearable item may be a clothing item or an armor item to be worn by the character.

(6)

The game program may cause the computer to perform: switching between the first preview display and the second preview display in response to a switch instruction based on an operation input by the user in the third scene.

With configuration (6) above, by switching between two different previews, it is possible to present an easy-to-understand preview to the user.

(7)

The third scene may be a scene in which the user selects a wearable item to be purchased and obtained by the character in the game, or a scene in which the user selects a wearable item to be worn by the character from among wearable items that have been obtained by the character.

With configuration (7) above, it is possible to present two different previews to the user at a point in time when a wearable item is purchased or a point in time when the wearable item is put on the character after the purchase.

(8)

The game program may cause the computer to perform: in the third scene, displaying the character, which is displayed based on a character model of the first type in the first preview display, or the character, which is displayed based on a character model of the second type in the second preview display, while applying at least one of changes: moving, rotating and enlarging/shrinking, thereto in response to an operation input from the user.

With configuration (8) above, the user can check the appearance of the character in greater detail.

Note that the present specification discloses an example of an information processing apparatus and an information processing system capable of executing the processes of configurations (1) to (8) above. The present specification also discloses a game processing method capable of executing the processes of configurations (1) to (8) above.

With the storage medium, the information processing apparatus, the information processing system and the game processing method described above, where models of different types are used for a character, the appearance of the character can be changed in accordance with the item being worn.

These and other objects, features, aspects and advantages of the present invention will become more apparent from the following detailed description of the present invention when taken in conjunction with the accompanying drawings.

BRIEF DESCRIPTION OF THE DRAWINGS

FIG. 19 is a flow chart showing an example of the flow of an item select scene process executed by a non-limiting game system.

DETAILED DESCRIPTION OF NON-LIMITING EXAMPLE EMBODIMENTS

[1. Configuration of Game System]

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
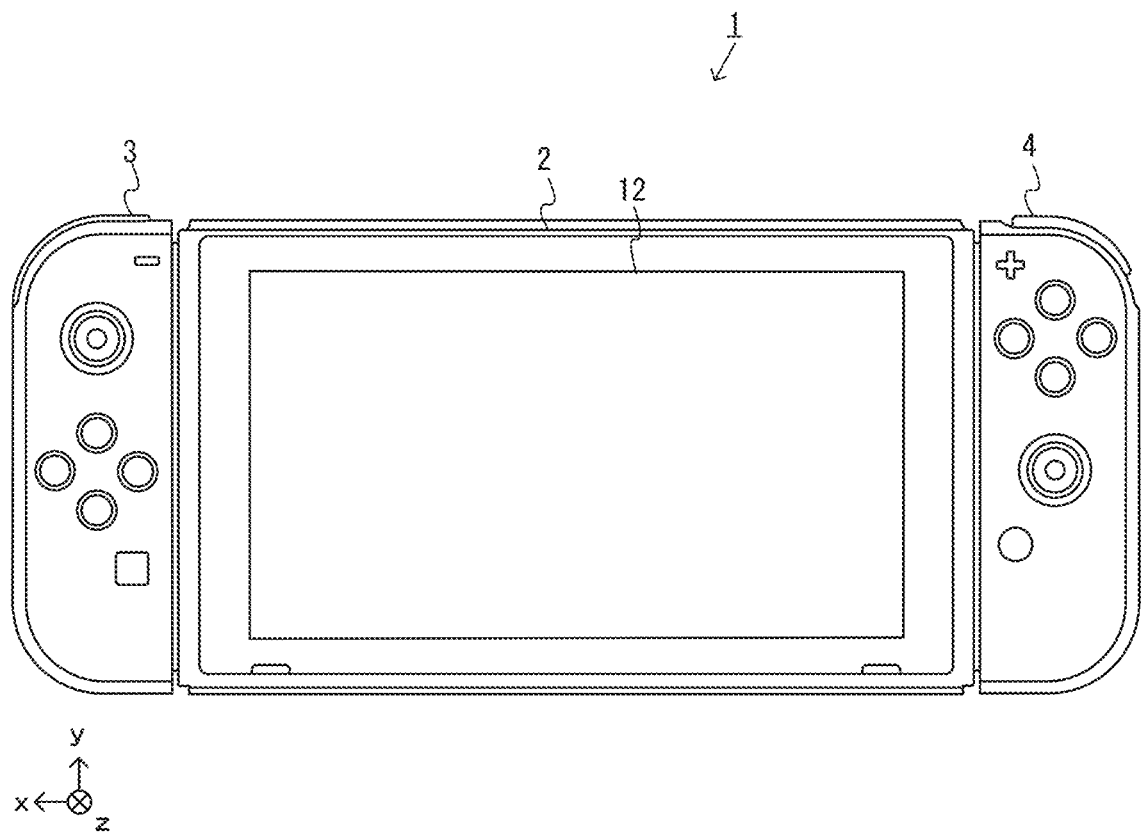
FIG. 1 is a view showing an example where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
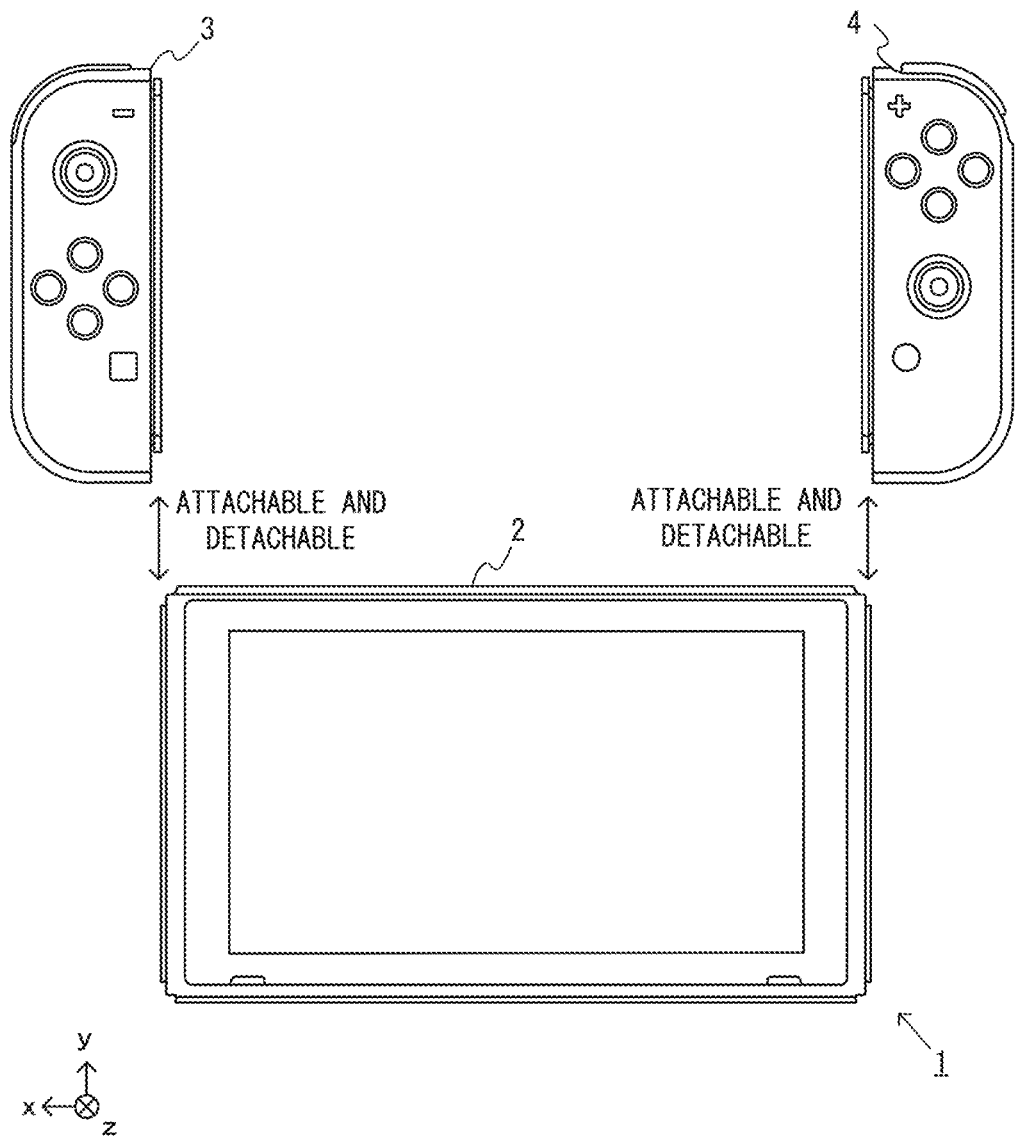
FIG. 2 is a view showing an example where a non-limiting left controller and a non-limiting right controller are removed from a non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
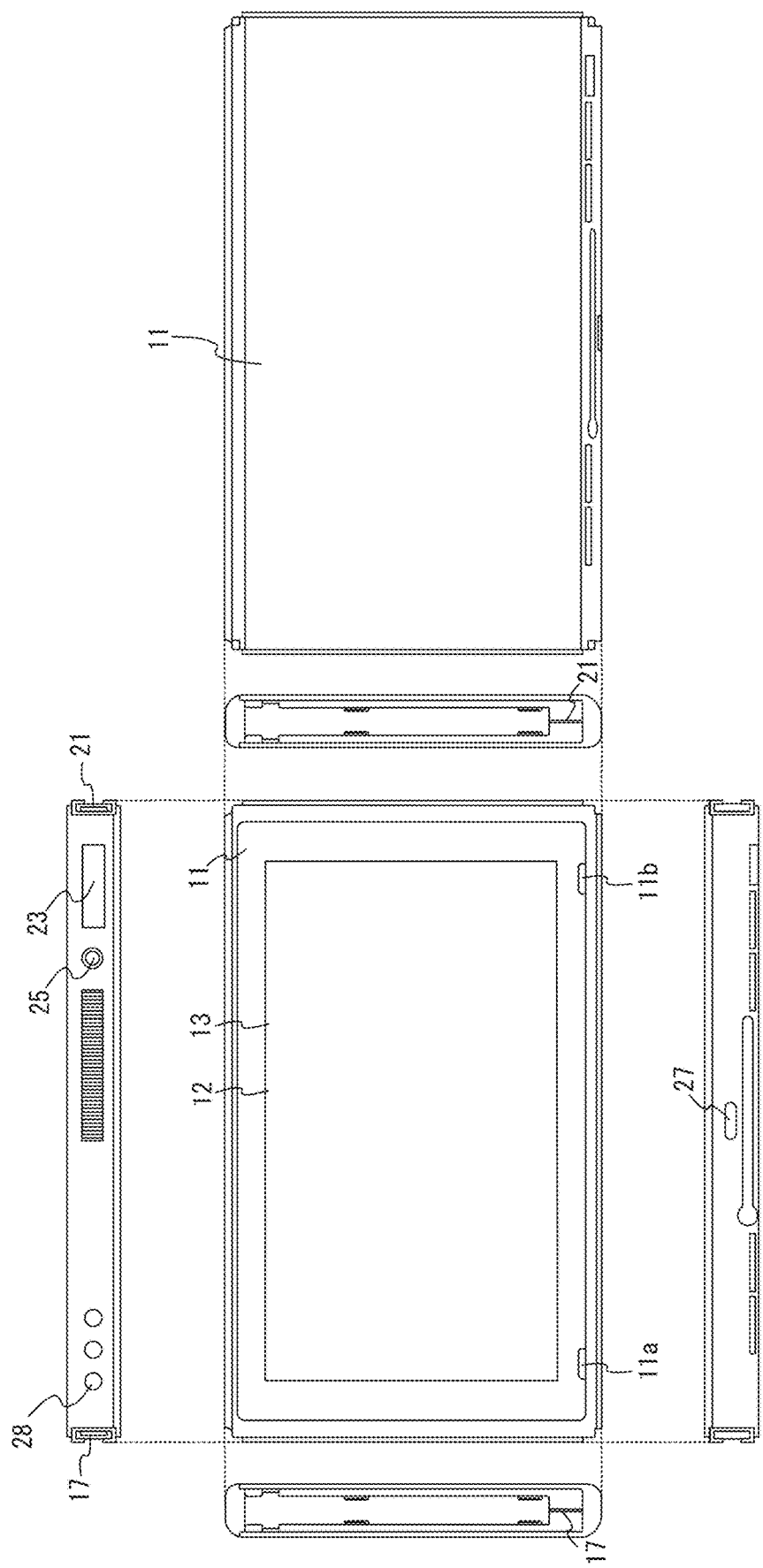
FIG. 3 is a six-sided view showing an example of a non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
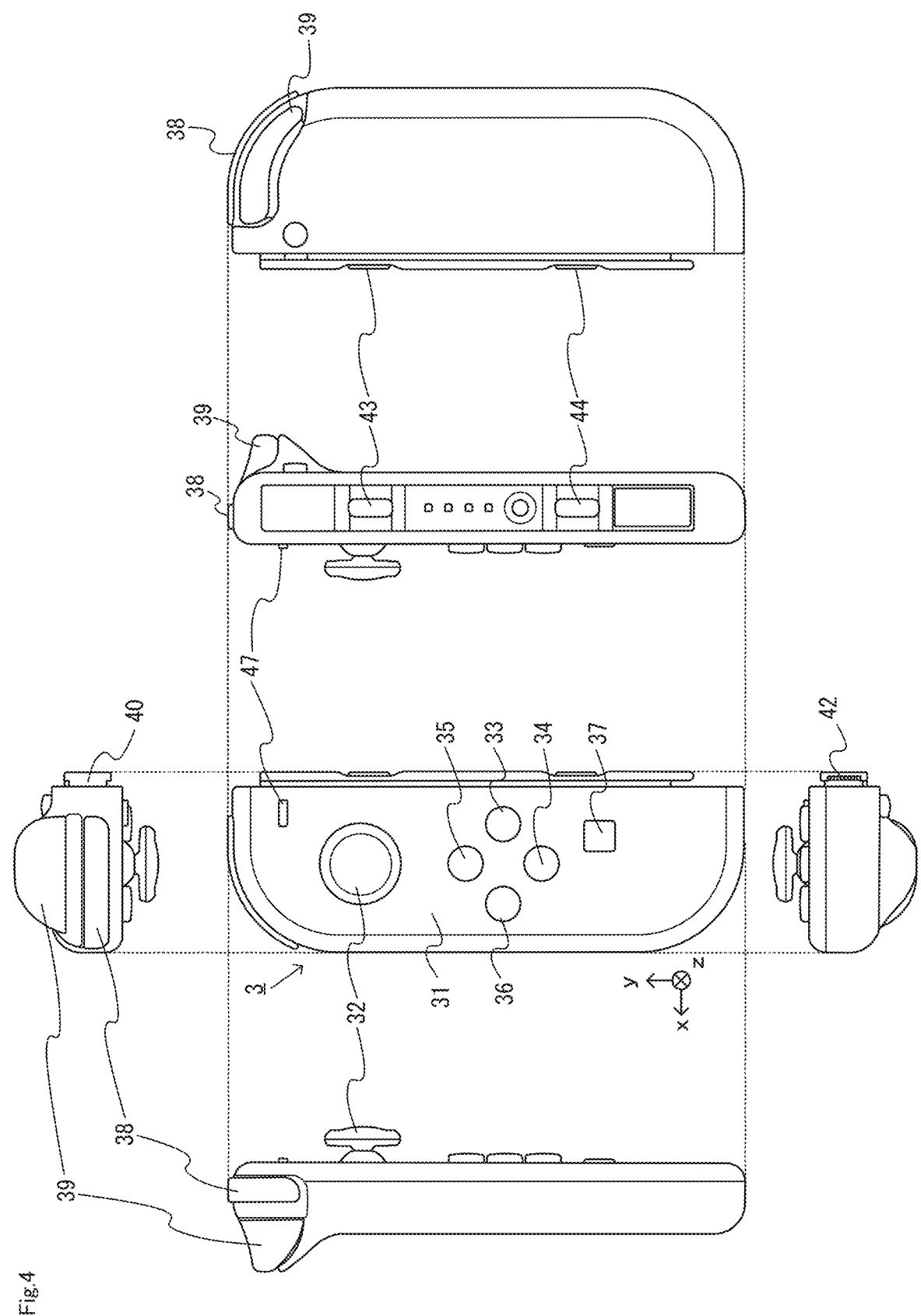
FIG. 4 is a six-sided view showing an example of a non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
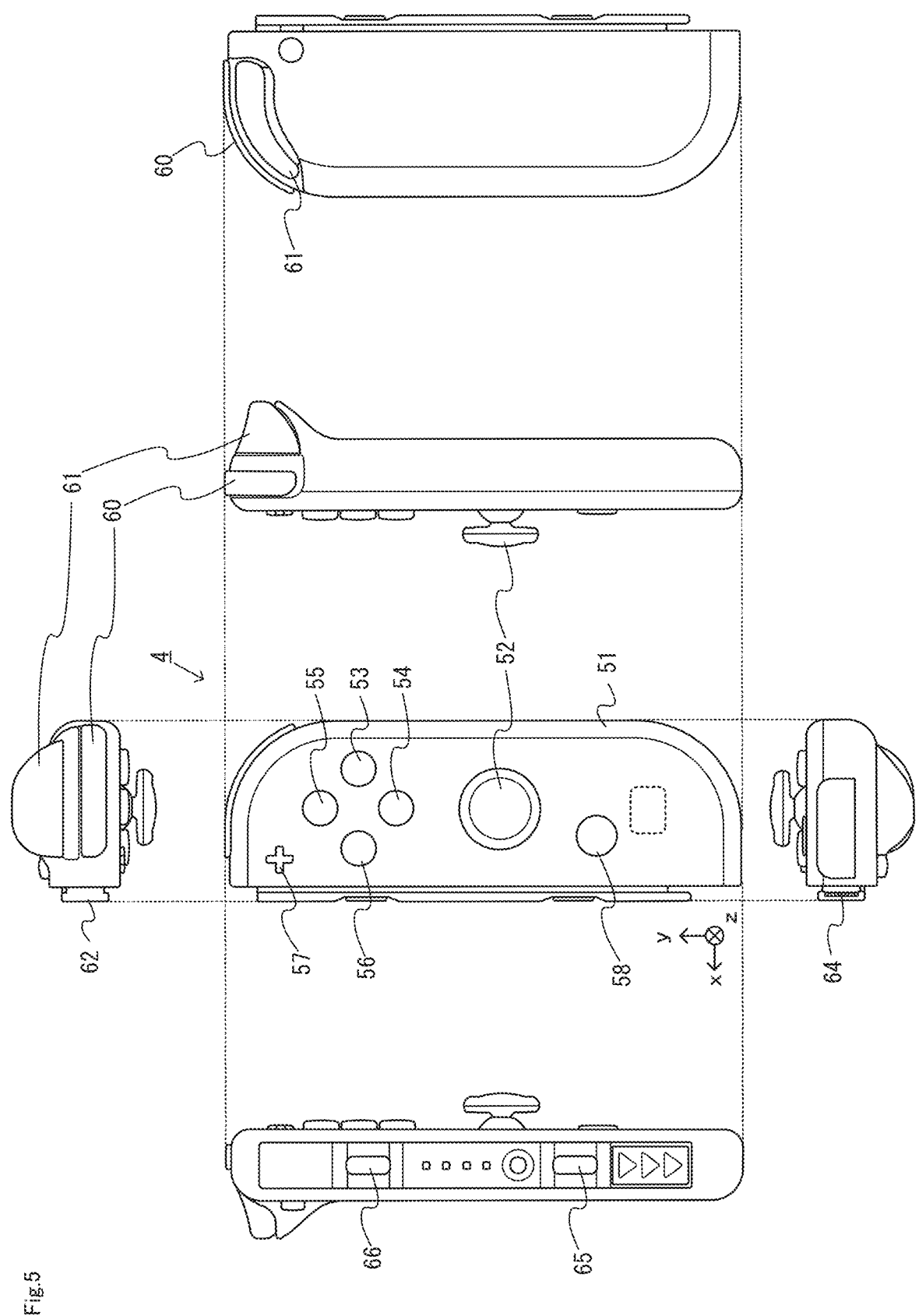
FIG. 5 is a six-sided view showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
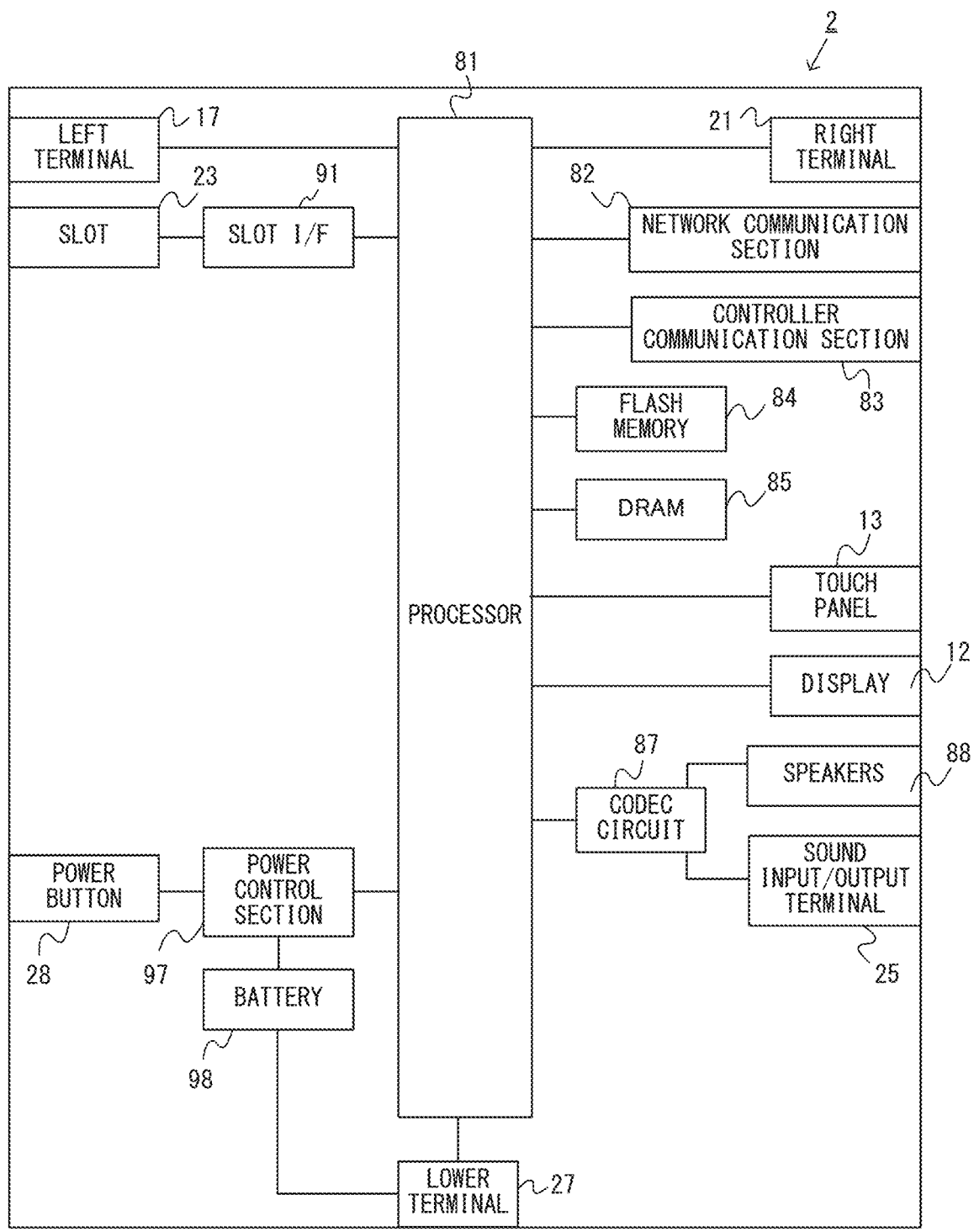
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81 to 85, 87, 88, 91, 97, and 98 shown in FIG. 6 in addition to the components shown in FIG. 3. Some of the components 81 to 85, 87, 88, 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
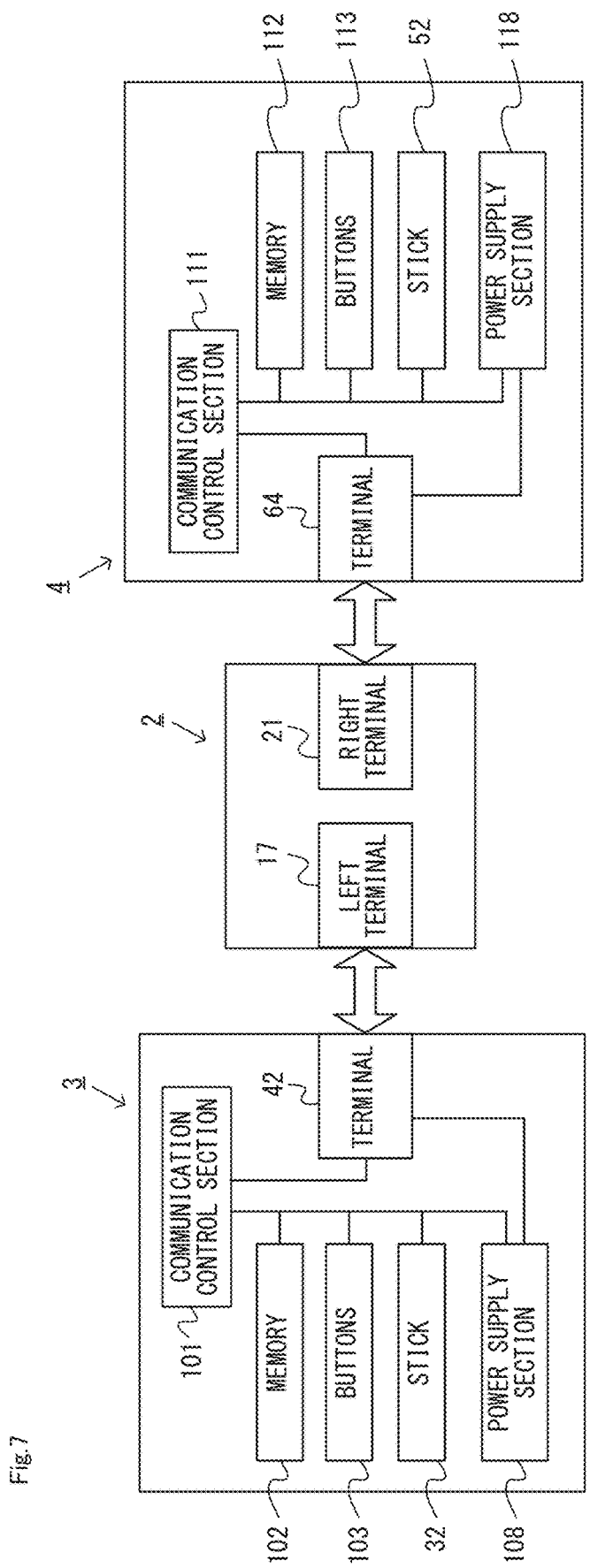
FIG. 7 is a block diagram showing an example of an internal configuration of a non-limiting main body apparatus, a non-limiting left controller and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[2. Outline of Process on Game System]

Next, referring to FIG. 8 to FIG. 13, the outline of the process executed by the game system 1 will be described. In the present embodiment, the game system 1 executes a game in which a player character, which is a game object controlled by the user (referred to also as "player") of the game system 1, appears in a three-dimensional virtual space (referred to also as "game space").

[2-1. Field Scene and Battle Scene]

In the game described above, game images of different types of scenes may be displayed on the display 12. In the present embodiment, the different types of scenes include a field scene (see FIG. 8) and a battle scene (see FIG. 9). Note that the scenes displayed during the game are not limited to these two scenes, and the game system 1 may also display other scenes. Although details will be described later, the game system 1 in the present embodiment may also display a game image of an item select scene (see FIG. 10) to be described below or of an event scene, in addition to the two scenes described above.

Figure 8:
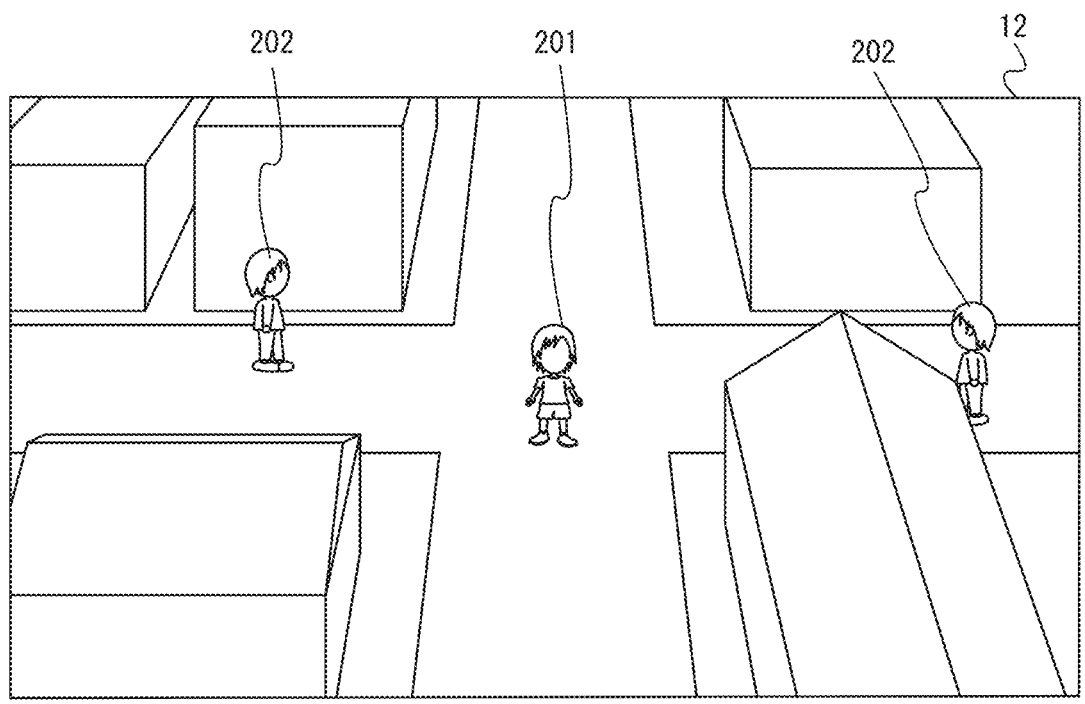
FIG. 8 is a view showing an example of a game image displayed on a display in a field scene.

FIG. 8 is a view showing an example of a game image displayed on the display 12 in the field scene. As shown in FIG. 8, the field scene is a scene in which the game field where the player character 201 is placed is displayed. In the field scene, the player character 201 moves through the game field and converses with other characters (characters 202 in the example shown in FIG. 8) in response to user operations.

Figure 9:
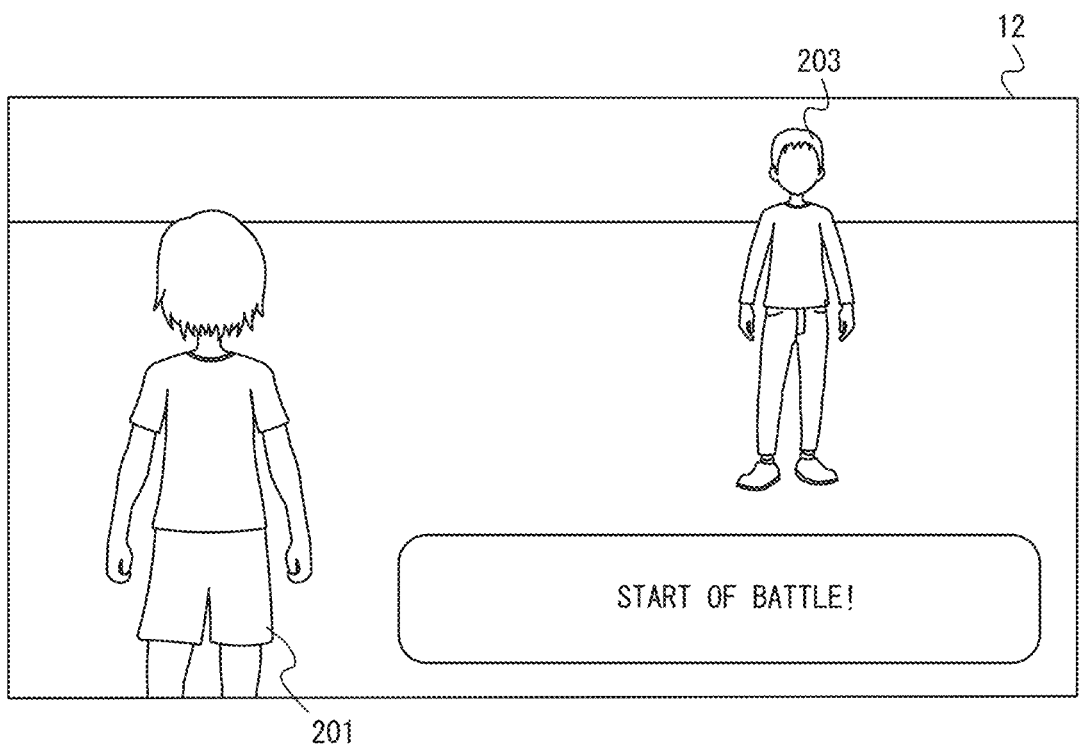
FIG. 9 is a view showing an example of a game image displayed on a display in a battle scene.

FIG. 9 is a view showing an example of a game image displayed on the display 12 in the battle scene. As shown in FIG. 9, the battle scene is a scene in which the player character 201 battles against an opponent character 203. For example, when the player character 201 encounters an opponent character 203 on the game field in the field scene, the game scene switches from the field scene to the battle scene. The battle in the battle scene may be of any content, and the characters may fight against each other or they may compete against each other with any content. In the present embodiment, when the battle scene ends (e.g., when the battle is over), the game scene returns from the battle scene to the field scene.

As shown in FIG. 8 and FIG. 9, in the present embodiment, characters (i.e., the player character 201 and other characters) appearing in the field scene and the battle scene are each displayed in different forms in the field scene and in the battle scene. Specifically, each character is displayed in the field scene in a form with a low head-height ratio (the form in which the head-height ratio is 2 to 3 in the example shown in FIG. 8), and displayed in the battle scene in a form with a high head-height ratio (the form in which the head-height ratio is 5 to 6 in the example shown in FIG. 9). Thus, in the present embodiment, each character is displayed in the field scene in a form with a lower head-height ratio than in the battle scene.

In the present embodiment, the game system 1 prepares two types of three-dimensional models for each character appearing in the field scene and the battle scene. Specifically, for one type of a character, the game system 1 stores a three-dimensional model for the field scene and a three-dimensional model for the battle scene. In the present embodiment, for the same character, the three-dimensional model for the field scene has a lower head-height ratio than the three-dimensional model for the battle scene. Hereafter, the three-dimensional model for the field scene is referred to as the "low-head-height-ratio model" and the three-dimensional model for the battle scene is referred to as the "high-head-height-ratio model". The game system 1 displays characters in the field scene based on the low-head-height-ratio model (i.e., by placing the low-head-height-ratio model in the game field or making the low-head-height-ratio model perform actions), and displays characters in the battle scene based on the high-head-height-ratio model.

As described above, in the present embodiment, the game system 1 displays characters in different forms (in the present embodiment, with different head-height ratios) in the field scene and in the battle scene in the game. Specifically, characters are displayed using different three-dimensional models in the field scene and in the battle scene in the game. Thus, the game system 1 can display characters in different forms for the two types of scenes. In the present embodiment, characters can be rendered in the field scene in the low-head-height-ratio form, which is a relatively simple design, whereas the characters can be rendered in the battle scene in the high-head-height-ratio form, which is a detailed design. In one example, the amount of data for the low-head-height-ratio model for a character may be smaller than the amount of data for the high head model for that character. Then, the processing load can be reduced and/or the processing speed can be accelerated when generating game images in the field scene while characters with a detailed design can be displayed in the battle scene.

In other scenes that are different from the field scene and the battle scene, either the low-head-height-ratio model or the high-head-height-ratio model may be used. In the present embodiment, the game system 1 displays characters based on the high-head-height-ratio model in the event scene (as in the battle scene) in the game. For example, the event scene is a scene in which story events take place to advance the game story. For example, in the event scene, a movie is displayed in which the player character performs an action, e.g., having a conversation, with a particular character. For example, when the player character talks to the particular character in the field scene or when the player character wins a battle against a particular character in the battle scene, the game scene switches from the field scene or the battle scene to the event scene. By using the high-head-height-ratio model in the event scene, the character can be rendered with a detailed design in the event scene as in the battle scene.

Note that for objects placed in the game space that are different from characters (e.g., terrain objects and building objects), the game system 1 may use the same model in different types of scenes. For example, the game system 1 may store one type of models of these objects and display the game image based on the same model in each of the scenes such as the field scene and the battle scene. Then, the form of the characters is varied between the field scene and the battle scene and the event scene, whereas the terrain objects and building objects are displayed in the same form in these scenes. Thus, it is possible to reduce the amount of data for the models to be prepared, and speed up processing when switching between scenes. Note that in other embodiments, the game system 1 may use different models for these objects, as with characters, between scenes in which the low-head-height-ratio model is used and scenes in which the high-head-height-ratio model is used.

[2-2. Wearable Items]

In the present embodiment, wearable items are provided for the player character 201. For example, wearable items are items of clothing (which means to include bags and hats) and/or armors. Note that a wearable item may be any item that can be worn by the player character 201, and if the player character 201 is a robot, a part of the player character 201 (e.g., a part of the robot's hand) may be a wearable item. In the present embodiment, the appearance of the player character 201 changes in accordance with the wearable item that is worn by the player character 201 (see FIG. 10 and FIG. 11).

In the present embodiment, a set of clothing items (e.g., a jacket and pants) worn on the whole body of the player character 201 is a single wearable item. In the present embodiment, the number of wearable items that can be worn simultaneously by the player character 201 is one. Note that in other embodiments, the player character 201 may be allowed to wear multiple wearable items at the same time. That is, in other embodiments, items that are worn on parts of the body of the player character 201 (e.g., an item such as a jacket and a hat) may each be treated as a single wearable item, and wearable items may be allowed to be worn on different parts of the body of the player character 201.

In the present embodiment, different types of wearable items (e.g., difference types of sets of clothing) that differ in appearance from each other are provided. In the game, the player character 201 can change the wearable item to be worn, and the appearance of the player character 201 changes in response to this change. The player character 201 can obtain wearable items during the game. For example, the player character 201 can purchase wearable items at a clothing store on the game field, and can wear new wearable items obtained through purchase.

In the present embodiment, when the player character 201 purchases a wearable item, a game image of the item select scene is displayed. For example, when the player character 201 enters a clothing store and talks to the character of a clerk in the clothing store, the game scene switches from the field scene to the item select scene.

FIG. 10 to FIG. 13 are views showing an example of a game image displayed on the display 12 in the item select scene. The item select scene is a scene in which the user selects an item to be worn by the player character 201.

Figure 10:
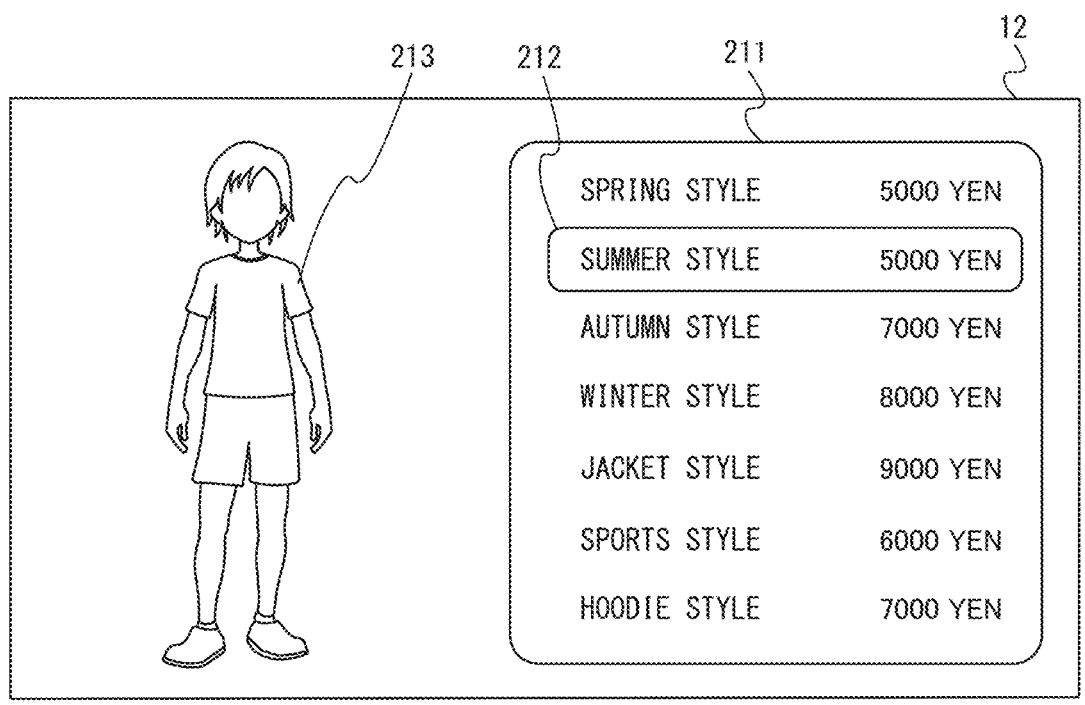
FIG. 10 is a view showing an example of a game image displayed on a display in an item select scene.

As shown in FIG. 10, the game image in the item select scene includes an item column 211, a selection image 212 and a preview image 213. The item column 211 shows a list of wearable items that can be purchased by the player character 201. The selection image 212 is an image that indicates, as the currently selected wearable item, one of the wearable items included in the list shown in the item column 211 (in the example shown in FIG. 10, it is an image of a frame that surrounds the currently selected item). Note that in the item select scene shown in FIG. 10, a wearable item called "Summer style" is being selected, and in the item select scene shown in FIG. 11, a wearable item called "Autumn style" is being selected. As a selection instruction to select one of the wearable items included in the list, the game system 1 accepts an operation input from the user to change the wearable item selected (i.e., specified by the selection image 212). In response to this operation input, the game system 1 changes the wearable item being selected and moves the selection image 212.

Figure 11:
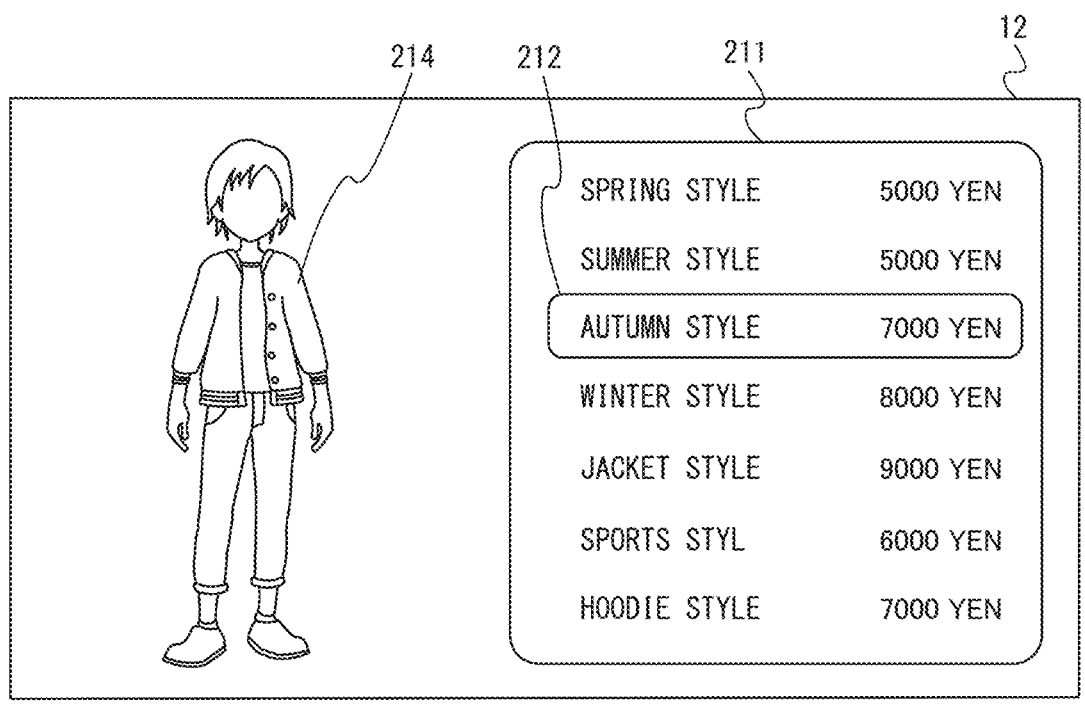
FIG. 11 is a view showing an example of a game image displayed on a display in an item select scene.

The preview image 213 shows the player character 201 having the appearance of wearing the wearable item that is being selected among other wearable items included in the list shown in the item column 211. For example, the preview image 213 shown in FIG. 10 shows the player character 201 wearing the wearable item called "Summer style", and the preview image 213 shown in FIG. 11 shows the player character 201 wearing the wearable item called "Autumn style". Thus, in the present embodiment, the preview image allows the user to check how the appearance of the player character 201 changes before purchasing the wearable item.

In the present embodiment, for each wearable item, the game system 1 stores a three-dimensional model having the appearance of the player character 201 wearing the wearable item. The game system 1 displays a preview image based on the three-dimensional model corresponding to the wearable item being selected.

Here, the three-dimensional model having the appearance of the player character 201 wearing a wearable item may be (a) a single model that includes the player character 201 and the wearable item, or (b) a three-dimensional model composed of a basic part (i.e., the part of the player character 201 that is not changed by the wearable item, e.g., the face part of the player character 201) and a model of the wearable item. In the case of (a) above, for each wearable item, the game system 1 stores a model of the entire player character 201 wearing the wearable item. Then, the game system 1 switches the entire three-dimensional model in response to a change in the selection of the wearable item. In the case of (b) above, the game system 1 stores a model of the basic part and a model of each wearable item. Then, in response to a change in the selection of the wearable item, the game system 1 switches the model of the wearable item while leaving the model of the basic part unchanged.

In the example shown in FIG. 10 and FIG. 11, the preview image shows the player character 201 in the high-head-height-ratio form. Here, in the present embodiment, the game system 1 may display, as the preview image, an image showing the player character 201 in the low-head-height-ratio form. In the present embodiment, the game system 1 accepts a predetermined operation input from the user as a switch instruction to switch the form of the preview image in the item select scene. The game system 1 switches the form of the preview image between the low-head-height-ratio form and the high-head-height-ratio form in response to this operation input.

Figure 12:
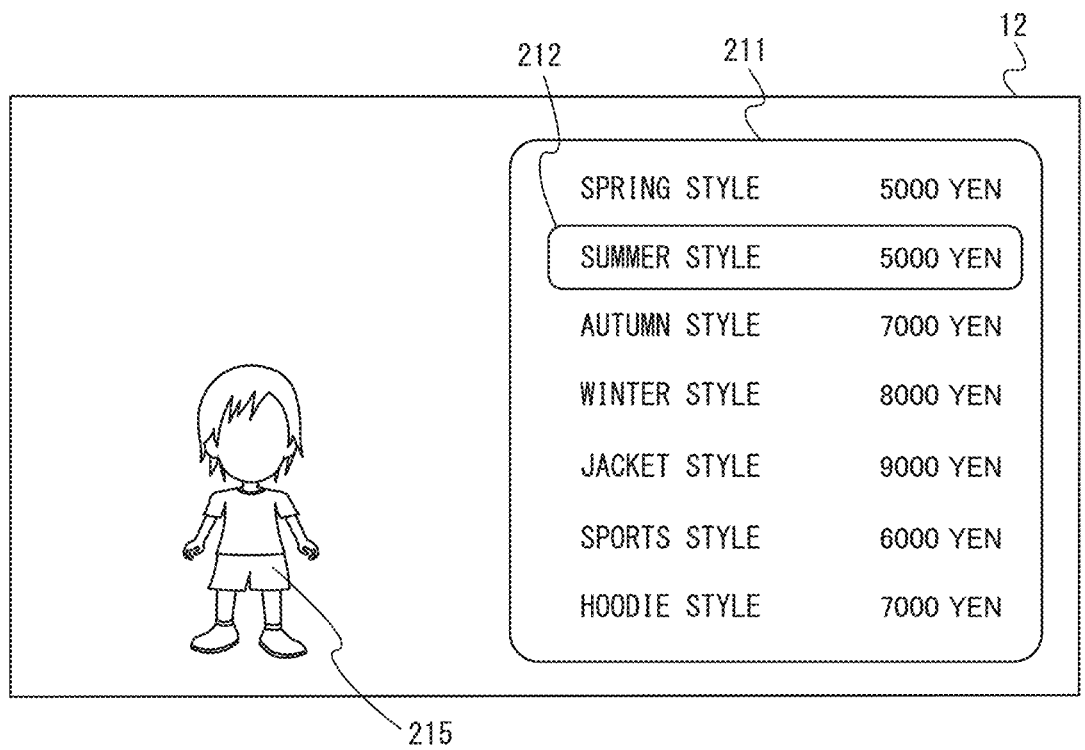
FIG. 12 is a view showing an example of a game image displayed on a display in an item select scene.
Figure 13:
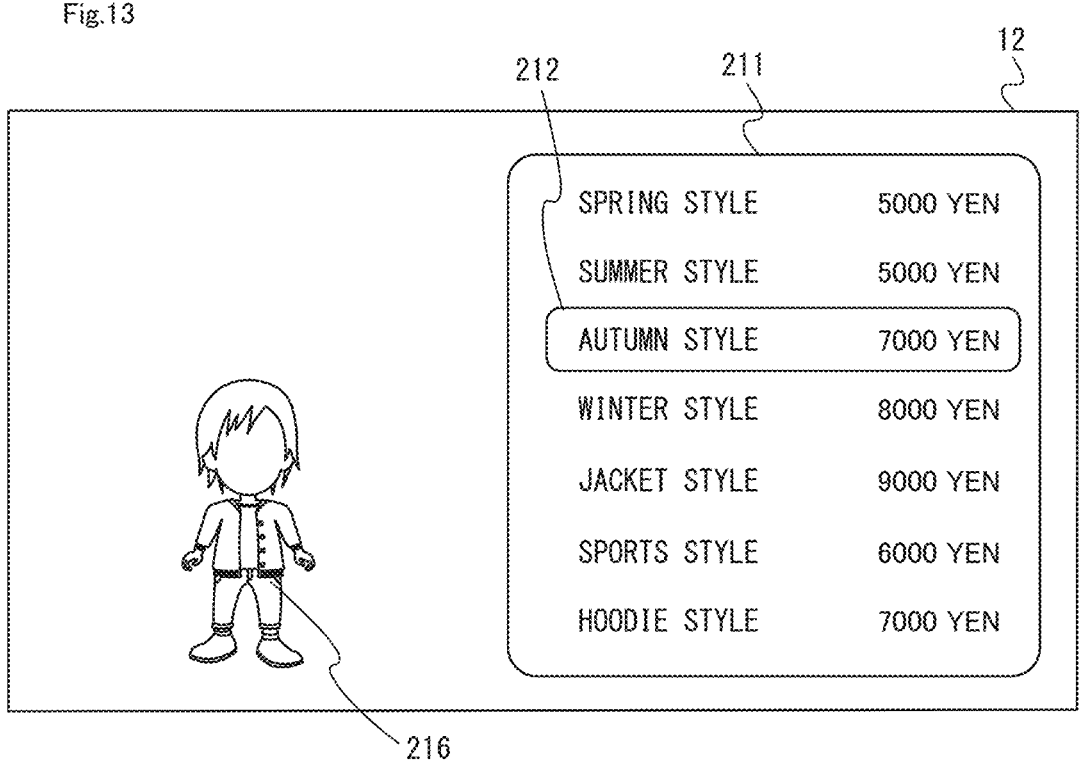
FIG. 13 is a view showing an example of a game image displayed on a display in an item select scene.

FIG. 12 shows an example of the game image in the item select scene when a switch instruction has been given from the state shown in FIG. 10. FIG. 13 shows an example of the game image in the item select scene when a switch instruction has been given from the state shown in FIG. 11. In the example shown in FIG. 12, the preview image 213 showing the player character 201 in the high-head-height-ratio form having the appearance of wearing a "Summer style" wearable item switches to the preview image 215 showing the player character 201 in the low-head-height-ratio form having the appearance of wearing the same "Summer style" wearable item. In the example shown in FIG. 13, the preview image 214 showing the player character 201 in the high-head-height-ratio form having the appearance of wearing an "Autumn style" wearable item switches to the preview image 216 showing the player character 201 in the low-head-height-ratio form having the appearance of wearing the same "Autumn style" wearable item. Thus, in the present embodiment, the game system 1 presents a preview image of the player character 201 for both of the low-head-height-ratio form and the high-head-height-ratio form. This allows the user to check the preview images for both forms. Note that when a switch instruction is given, the type of the wearable item worn by the player character 201 is not changed, and only the form of the player character 201 is changed.

In the present embodiment, for each wearable item, the game system 1 stores both the low-head-height-ratio model and the high-head-height-ratio model as three-dimensional models having the appearance of the player character 201 wearing the wearable item. In response to a switch instruction, the game system 1 switches the form of the preview image by switching the three-dimensional model used to display the preview image between the low-head-height-ratio model and the high-head-height-ratio model. Note that in the case of (a) above, for each wearable item, the game system 1 stores both the low-head-height-ratio model and the high-head-height-ratio model for the three-dimensional model, which includes the player character 201 and the wearable item. In the case of (b) above, the game system 1 stores both the low-head-height-ratio model and the high-head-height-ratio model for the model of the basic part, and stores, for each wearable item, both the low-head-height-ratio model and the high-head-height-ratio model for the model of the wearable item.

As described above, in the present embodiment, the game system 1 performs the first preview display in which the player character 201 based on the character model of the first type is displayed (i.e., display of the preview image in the low-head-height-ratio form) and performs the second preview display in which the player character 201 based on the character model of the second type is displayed (i.e., display of the preview image in the high-head-height-ratio form). This allows the user to check preview images of the two different forms. For example, according to the present embodiment, it is possible to reduce, both for the low-head-height-ratio model and for the high-head-height-ratio model, the possibility that the user may feel, after purchasing and wearing a wearable item on player character 201, that the appearance of the player character 201 is different from the expected image.

Note that as will be described below, in the present embodiment, after the end of the item select scene, the scene switches to the field scene and the scene does not switch from the item select scene to the battle scene or the event scene. Therefore, the user cannot check the appearance of the player character 201 in the high-head-height-ratio form immediately after the item select scene. In this regard, in the present embodiment, the appearance of the player character 201 in the high-head-height-ratio form can be checked in the item select scene, thereby improving the usability for the user.

In the present embodiment, the game system 1 switches between the first preview display and the second preview display in the item select scene in response to a switch instruction based on the operation input by the user. Therefore, by switching between preview images of two different forms, it is possible to display the preview images in a large size, and thus to provide the user with a preview image that is easy to view.

Note that in other embodiments, the game system 1 may simultaneously display preview images of the two different forms in the item select scene. As in the present embodiment, this allows the user to check preview images of the two different forms.

In the present embodiment, the user can rotate the player character 201 shown by the preview image in the item select scene. This allows the user to have the player character 201 displayed as seen from various directions and to more specifically check the appearance of the player character 201 wearing a wearable item. Specifically, the game system 1 accepts an operation input from the user to give a rotation instruction, and rotates the model (i.e., the low-head-height-ratio model or the high-head-height-ratio model) arranged in the virtual space in response to the rotation instruction.

Note that in other embodiments, in addition to (or instead of) rotating the player character 201 shown by the preview image, the game system 1 may be able to enlarge or shrink or move the player character 201.

As described above, in the item select scene, the game system 1 displays the player character displayed based on the character model of the first type (i.e., the low-head-height-ratio model) in the first preview display or the player character displayed based on the character model of the second type (i.e., the high-head-height-ratio model) in the second preview display, while applying at least one of changes (moving, rotating and enlarging/shrinking) thereto in response to an operation input from the user. Therefore, the user can more specifically check the appearance of the player character through the preview display.

In the item select scene, the game system 1 receives a confirm instruction from the user to confirm the wearable item to be purchased. The user gives a confirm instruction while an intended wearable item is being selected, thus specifying the wearable item as the item to be purchased. In response to the confirm instruction, the game system 1 adds the wearable item that is being selected at the time of the confirm instruction to the list of items owned by the player character 201 in exchange for a predetermined amount of in-game currency owned by the player character 201.

In the present embodiment, when the confirm instruction is given, the game system 1 changes the wearable item worn by the player character 201 to the wearable item that has been purchased. Specifically, the game system 1 sets, as the model used to display the player character 201, a model showing the appearance of the player character 201 wearing the wearable item associated with the confirm instruction. Therefore, in any scene following the end of the item select scene, the player character 201 is displayed having the appearance of wearing the wearable item associated with the confirm instruction.

In other embodiments, when the confirm instruction is given, the game system 1 executes the process of adding the wearable item associated with the confirm instruction to the list of items owned by the player character 201, and the process of changing the wearable item worn by the player character 201 does not need to be executed at the time of purchase. Thus, immediately after the end of the item select scene, the appearance of the player character 201 is not changed from that in the field scene immediately before the item select scene. The game system 1 may execute the process of changing the wearable item worn by the player character 201 at any subsequent point in time (e.g., in response to the user giving a worn item change instruction to be described below).

In other embodiments, when the confirm instruction is given, the game system 1 may inquire the user whether the purchased wearable item be newly worn by the player character 201 (i.e., whether the wearable item worn by the player character 201 be changed to the purchased wearable item). If the user responds that the user wishes the purchased wearable item be newly worn by the player character 201, the game system 1 may execute the process of changing the wearable item worn by the player character 201.

In the item select scene, the game system 1 accepts an end instruction from the user to end the item select scene. In response to the exit instruction, the game system 1 ends the item select scene and switches the game scene from the item select scene to the field scene.

In the present embodiment, the game system 1 may display the game image of the item select scene at any other point in time, other than when purchasing a wearable item. For example, the game system 1 may accept a worn item change instruction from the user in the field scene and switch the game scene from the field scene to the item select scene in response to the worn item change instruction. Note that in the item select scene at this time, a list of wearable items owned by the player character 201 is displayed in the item column. Then, in response to the confirm instruction given, the game system 1 sets the wearable item that is being selected at the time of the confirm instruction, as the wearable item to be newly worn by the player character 201.

As described above, the item select scene may be a scene in which the user selects a wearable item to be obtained through purchase by the player character 201 in the game, or a scene in which the user selects a wearable item to be worn by the player character 201 from among the wearable items that have been obtained. Therefore, the user can have the purchased wearable item worn by the player character 201 at the time of purchasing the wearable item or at a point in time subsequent to the purchase. At such points in time, the preview image can be presented to the user both for the low-head-height-ratio model and for the high-head-height-ratio model.

There is no limitation on the condition under which the game scene switches to the item select scene, and it is not limited to when a wearable item is purchased or when a worn item change instruction is given, but may be any other condition. In other embodiments, the game system 1 may switch the game scene to the item select scene only in one of the above two cases.

[3. Specific Example of Process Performed on Game System]

Next, referring to FIG. 14 to FIG. 19, a specific example of an information process performed on the game system 1 will be described.

Figure 14:
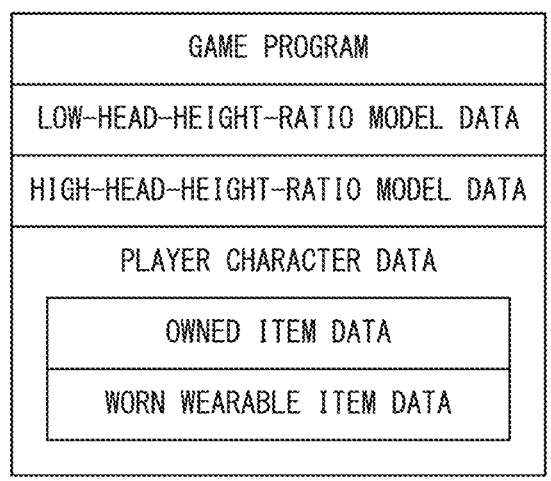
FIG. 14 is a view showing an example of various data used in information processes performed on a non-limiting game system.

FIG. 14 is a chart showing an example of various data to be used in an information process performed on the game system 1. Various data shown in FIG. 14 are stored in a storage medium (e.g., the flash memory 84, the DRAM 85, and/or a memory card in the slot 23) that can be accessed by the main body apparatus 2.

As shown in FIG. 14, the game system 1 stores a game program. The game program is a game program for executing a game process of the present embodiment (specifically, the process shown in FIG. 15 to FIG. 19). The game system 1 also stores the low-head-height-ratio model data, the high-head-height-ratio model data and the player character data.

The low-head-height-ratio model data is data of the low-head-height-ratio model described above that is provided for each character. The low-head-height-ratio model data includes three-dimensional model data for each character appearing in the field scene. Note that for the player character 201, different three-dimensional model data for each wearable item is included in the low-head-height-ratio model data.

The high-head-height-ratio model data is data of the high-head-height-ratio model described above that is provided for each character. The high-head-height-ratio model data includes three-dimensional model data for each character appearing in the battle scene or the event scene. Note that for the player character 201, different three-dimensional model data for each wearable item is included in the high-head-height-ratio model data.

The player character data indicates various information about the player character 201. In the present embodiment, the player character data includes owned item data and worn item data. The owned item data indicates items, such as wearable items, owned by the player character 201. The worn item data indicates one of the wearable items owned by the player character 201 that is currently worn by the player character 201.

Figure 15:
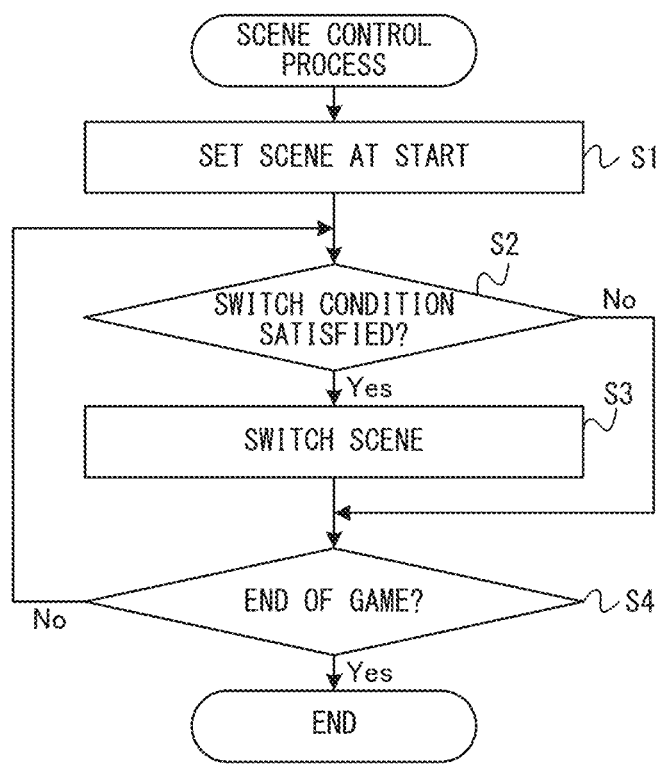
FIG. 15 is a flow chart showing an example of the flow of a scene control process executed by a non-limiting game system.

FIG. 15 is a flow chart showing an example of the flow of a scene control process executed by the game system 1. The scene control process is a process for controlling the switching between scenes in the game. The scene control process is started, for example, in response to the player giving an instruction to start the game during execution of the game program described above. FIG. 16 to FIG. 19 are processes that are executed in different scenes (i.e., the field scene, the battle scene, the event scene or the item select scene) in the game. That is, one of the processes of FIG. 16 to FIG. 19 is executed depending on the scene that is set by the scene control process.

Note that in the present embodiment, it is assumed that the processor 81 of the main body apparatus 2 executes the processes of the steps shown in FIG. 15 to FIG. 19 by executing the game program stored in the game system 1. Note however that in other embodiments, some of the processes of the steps may be executed by another processor (e.g., a dedicated circuit) different from the processor 81. When the game system 1 can communicate with another information processing apparatus (e.g., a server), some of the processes of the steps shown in FIG. 15 to FIG. 19 may be executed on the other information processing apparatus. The processes of the steps shown in FIG. 15 to FIG. 19 are merely illustrative, and the order of steps to be performed may be switched around or other processes may be executed in addition to (or instead of) the processes of the steps, as long as similar results are obtained.

The processor 81 executes the processes of the steps shown in FIG. 15 to FIG. 19 using a memory (e.g., the DRAM 85). That is, the processor 81 stores information (in other words, data) obtained in each process step in the memory, and when the information is used in a subsequent process step, the information is read out from the memory and used.

In step S1 shown in FIG. 15, the processor 81 sets the scene at the start of the game. While the scene may be any scene at the start of the game, it is assumed in the present embodiment that the scene at the start of the game is the field scene. The process of step S2 is executed, following step S1.

In step S2, the processor 81 determines whether a switch condition for switching between scenes in the game has been satisfied. In the present embodiment, the switch conditions for switching between scenes are as follows.

Switch condition to switch to the battle scene: the player character 201 has encountered a battle opponent character in the field scene.

Switch condition to switch to the event scene: the player character has talked to a particular character in the field scene, or the player character has won a battle against a particular character in the battle scene.

Switch condition to switch to the item select scene: the player character 201 has talked to a clothing store clerk character in the field scene.

Switch condition to switch to the field scene: a battle has ended in the battle scene, an event has ended in the event scene, or the user has given an end instruction in the item select scene.

The above switch conditions are examples, and scenes may be switched from one to another based on other conditions in other embodiments. If it is determined in step S2 that any of the switch conditions has been satisfied, the process of step S3 is executed. On the other hand, if it is determined that none of the switch conditions is satisfied, the process of step S4 is executed, skipping the process of step S3.

In step S3, the processor 81 switches the scene of the game to another scene that is in accordance with the switch condition that is determined to have been satisfied in step S2. That is, the processor 81 ends the scene process that has been executed so far among the scene processes shown in FIG. 16 to FIG. 19, and starts executing a scene process that is associated with the scene for which the switch condition has been satisfied. The process of step S4 is executed, following step S3.

In step S4, the processor 81 determines whether or not to end the game. For example, the processor 81 determines whether an instruction to end the game has been given by the user. If the determination result from step S4 is negative, the process of step S2 is executed again. Thereafter, a series of processes of steps S2 to S4 is repeatedly executed until it is determined in step S4 to end the game. On the other hand, if the determination result from step S4 is affirmative, the processor 81 ends the scene control process shown in FIG. 15. Then, the processor 81 ends the scene process being executed from among the scene processes shown in FIG. 16 to FIG. 19.

Figure 16:
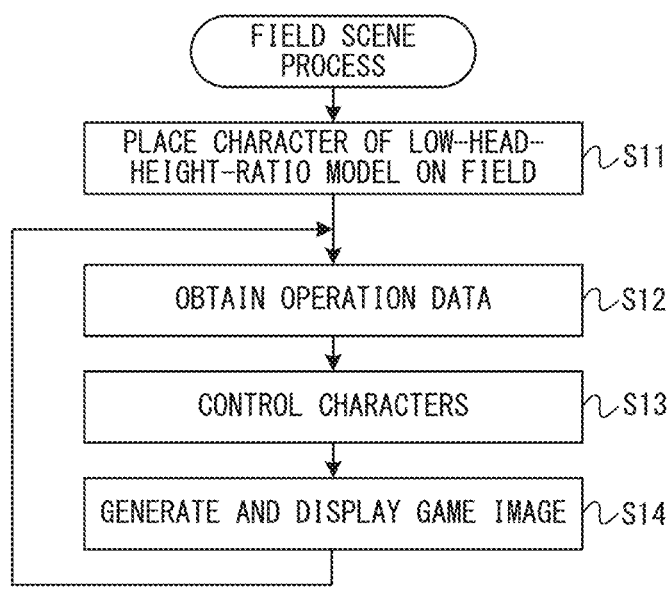
FIG. 16 is a flow chart showing an example of the flow of a field scene process executed by a non-limiting game system.

FIG. 16 is a flow chart showing an example of the flow of the field scene process executed by the game system 1. The field scene process is a game process for advancing the game in the field scene. The field scene process is started in response to the scene control process setting the game scene to the field scene. The field scene process continues to be executed while the game scene is set to the field scene, and the field scene process ends in response to the scene control process determining to switch the game scene from the field scene to another scene.

In step S11, the processor 81 uses the low-head-height-ratio model data stored in the above storage medium to place the low-head-height-ratio model on the game field for each character placed on the game field (i.e., the player character

201 and other characters). The process of step S12 is executed, following step S11.

In step S12, the processor 81 obtains operation data that indicates an operation input by the user. That is, the processor 81 obtains the operation data received from each controller via the controller communication section 83 and/or the terminals 17 and 21 at an appropriate point in time and stores the operation data in the memory. The process of step S13 is executed, following step S12.

In step S13, the processor 81 controls the characters on the game field. For example, in the present embodiment, an action control as follows is performed for the characters. Specifically, the processor 81 moves the player character 201 (specifically, the low-head-height-ratio model of the player character 201) on the game field based on the operation data obtained in step S12. For example, the processor 81 moves the player character 201 in the direction in accordance with the direction input to the controller. Where the player character 201 is located in the vicinity of another character, in response to the user giving a predetermined instruction, the processor 81 also causes the player character 201 and the other character to have a conversation with each other. The processor 81 moves other characters other than the player character 201 on the game field in accordance with an algorithm defined in the game program. Note that in the present embodiment, a series (loop) of processes of steps S12 to S14 is repeatedly executed at a rate of once per a predetermined amount of time (e.g., one frame time). Over one iteration of the process of step S13, the processor 81 causes each character to act by an amount in accordance with the predetermined amount of time. The process of step S14 is executed, following step S13.

In step S14, the processor 81 generates a game image of the field scene reflecting the process result from step S13 and displays the game image on the display 12. Note that when a series (loop) of processes of steps S12 to S14 is repeatedly executed, the process of step S14 is repeatedly executed at a rate of once per the predetermined amount of time. Thus, a movie is displayed showing how the characters act in the game field. Note that in the present embodiment, the game system 1 displays an image on the display 12, but the game system 1 may display an image on another display device different from the display 12 (e.g., a monitor connected to the main body apparatus 2). The process of step S12 is executed again, following step S14.

Figure 17:
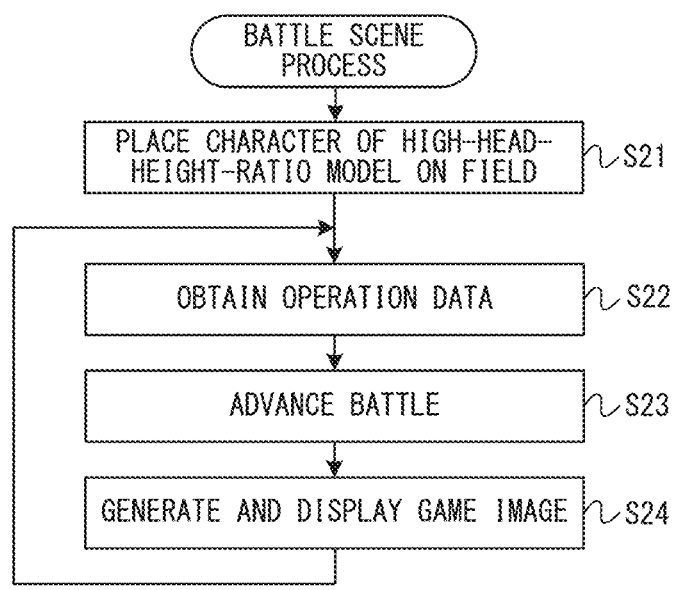
FIG. 17 is a flow chart showing an example of the flow of a battle scene process executed by a non-limiting game system.

FIG. 17 is a flow chart showing an example of the flow of a battle scene process executed by the game system 1. The battle scene process is a game process for advancing the game in the battle scene. The battle scene process is started in response to the scene control process setting the game scene to the battle scene. The battle scene process continues to be executed while the game scene is set to the battle scene, and the battle scene process ends in response to the scene control process determining to switch the game scene from the battle scene to another scene.

In step S21, the processor 81 places, on the game field, the high-head-height-ratio model for the characters to be engaged in a battle (i.e., the player character 201 and other battle opponent characters) using the high-head-height-ratio model data stored in the storage medium. The process of step S22 is executed, following step S21.

In step S22, the processor 81 obtains operation data that indicates an operation input by the user. The process of step S22 is similar to the process of step S12. The process of step S23 is executed, following step S22.

In step S23, the processor 81 executes the process of advancing the battle in the battle scene. For example, the processor 81 causes the high-head-height-ratio model of the player character 201 to act based on the operation data obtained in step S22, and also causes the high-head-height-ratio model of battle opponent characters based on an algorithm set in the game program. Note that in the battle scene, in addition to the action based on an operation by the user, the processor 81 may also cause an action that is not based on an operation by the user for a stage effect.

As described above, the content of the battle in the battle scene may be any content, and the content of the process for advancing the battle may also be any content. The game in the battle scene may be, for example, a game in the form in which the user inputs commands to instruct actions to be performed by the player character 201 and/or the companions of the player character 201. The game in the battle scene may be, for example, an action game in which the player character 201 is made to perform actions in response to an operation input by the user, or it may be a puzzle game, etc. The process of step S24 is executed, following step S23.

Note that a series (loop) of processes of steps S22 to S24 is repeatedly executed at a rate of once per a predetermined amount of time (e.g., one frame time). Over one iteration of the process of step S23, the processor 81 causes each character to act by an amount in accordance with the predetermined amount of time. In the process of step S23 while the process loop is repeated, the processor 81 changes a parameter set for each character (e.g., the parameter of the hit point value) and determines the winner/loser of the battle at an appropriate point in time. The processor 81 determines that the battle has ended when the winner/loser of the battle has been determined.

In step S24, the processor 81 generates a game image of the battle scene reflecting the process result from step S23 and displays the game image on the display 12. Note that when a series (loop) of processes of step S22 to S24 is repeatedly executed, the process of step S14 is repeatedly executed at a rate of once per the predetermined amount of time. Thus, a movie is displayed in which characters battle against each other. The process of step S22 is executed again, following step S24.

Figure 18:
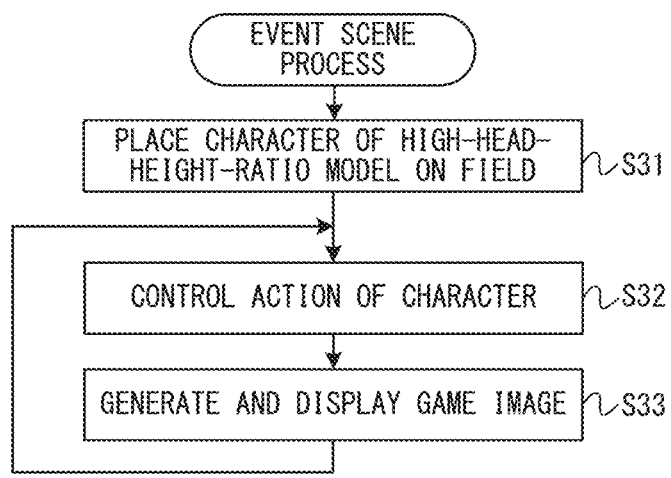
FIG. 18 is a flow chart showing an example of the flow of an event scene process executed by a non-limiting game system.

FIG. 18 is a flow chart showing an example of the flow of an event scene process executed by the game system 1. The event scene process is a game process for advancing a story event in the event scenes. The event scene process is started in response to the scene control process setting the game scene to the event scene. The event scene process continues to be executed while the game scene is set to the event scene, and the event scene process ends in response to the scene control process determining to switch the game scene from the event scene to another scene.

In step S31, the processor 81 places, on the game field, the high-head-height-ratio model on the game field for each character appearing in the event (i.e., the player character 201 and other characters) using the high-head-height-ratio model data stored in the storage medium. The process of step S32 is executed, following step S31.

In step S32, the processor 81 controls actions of the characters appearing in the event so that the characters perform their actions predetermined in the game program. For example, the processor 81 causes the high-head-height-ratio models of the characters to have a conversation or perform predetermined actions. The process of step S33 is executed, following step S32.

In the present embodiment, a series (loop) of processes of steps S32 to S33 is repeatedly executed at a rate of once per a predetermined amount of time (e.g., one frame time). Over one iteration of the process of step S32, the processor 81 causes each character to act by an amount in accordance with the predetermined amount of time.

In step S33, the processor 81 generates a game image of the event scene reflecting the process result from step S32 and displays the game image on the display 12. Note that when a series (loop) of processes of step S32 to S33 is repeatedly executed, the process of step S33 is repeatedly executed at a rate of once per the predetermined amount of time. Thus, a movie is displayed in which characters perform actions in accordance with the event. The process of step S32 is executed again, following step S34.

FIG. 19 is a flow chart showing an example of the flow of an item select scene process executed by the game system 1. The item select scene process is a game process for allowing the user to select a wearable item in the item select scene. The item select scene process is started in response to the scene control process setting the game scene to the item select scene. The item select scene process continues to be executed while the game scene is set to the item select scene, and the item select scene process ends in response to the scene control process determining to switch the game scene from the item select scene to another scene.

In step S41, the processor 81 performs settings at the start of the item select scene. Specifically, the processor 81 sets a list of wearable items to be displayed in the item column, and also sets a predetermined wearable item (e.g., the first wearable item in the list) to the state of being selected. For example, the processor 81 sets the high-head-height-ratio model (this may also be the low-head-height-ratio model) as the form of the preview image to be displayed at the start of the item select scene. Thus, immediately after the start of the item select scene, the list of wearable items is displayed in the item column, and a selection image that indicates the predetermined wearable item is displayed. A preview image is displayed showing the player character 201 in the high-head-height-ratio form having the appearance of wearing the predetermined wearable item. The process of step S42 is executed, following step S41.

In step S42, the processor 81 obtains operation data indicating an operation input by the user. The process of step S42 is similar to the process of step S12 described above. The process of step S43 is executed, following step S42.

In step S43, the processor 81 determines whether the selection instruction has been given based on the operation data obtained in step S42. If the determination result from step S43 is affirmative, the process of step S44 is executed. If the determination result from step S43 is negative, the process of step S45 is executed, skipping the process of step S44.

In step S44, in response to the selection instruction, the processor 81 changes the wearable item to be in the state of being selected from among the wearable items included in the list shown in the item column. The process of step S45 is executed, following step S44.

In step S45, the processor 81 determines whether the confirm instruction has been given based on the operation data obtained in step S42. If the determination result from step S45 is affirmative, the process of step S46 is executed. If the determination result from step S45 is negative, the process of step S47 is executed, skipping the process of step S46.

In step S46, the processor 81 puts, on the player character 201, the wearable item being selected from among the wearable items included in the list shown in the item column. Specifically, the processor 81 updates the worn item data stored in the storage medium so as to indicate the wearable item being worn. As a result, the player character 201 is displayed having the appearance of wearing the wearable item as updated, in the field scene, the battle scene and the event scene thereafter. In step S46, the processor 81 adds the wearable item being selected to the list of wearable items owned by the player character 201. Specifically, the processor 81 updates the owned item data stored in the storage medium so as to include the wearable item being worn. The process of step S47 is executed, following step S46.

In step S47, the processor 81 determines whether the switch instruction has been given based on the operation data obtained in step S42. If the determination result from step S47 is affirmative, the process of step S48 is executed. If the determination result from step S47 is negative, the process of step S49 is executed, skipping the process of step S48.

In step S48, the processor 81 switches the form of the preview image. That is, if the form of the preview image at present is the high-head-height-ratio form, the processor 81 sets the three-dimensional model used for the preview image to the low-head-height-ratio model so as to change the form of the preview image to the low-head-height-ratio form. If the form of the preview image at present is the low-head-height-ratio form, the processor 81 sets the three-dimensional model used for the preview image to the high-head-height-ratio model so as to change the form of the preview image to high-head-height-ratio form. The process of step S49 is executed, following step S48.

In step S49, the processor 81 determines whether the rotation instruction has been given based on the operation data obtained in step S42. If the determination result from step S49 is affirmative, the process of step S50 is executed. If the determination result from step S49 is negative, the process of step S51 is executed, skipping the process of step S50.

In step S50, the processor 81 rotates the three-dimensional model used for the preview image in the virtual space in response to the rotation instruction. Note that in the present embodiment, a series (loop) of processes of steps S42 to S51 is repeatedly executed at a rate of once per a predetermined amount of time (e.g., one frame time). Over one iteration of the process of step S50, the processor 81 rotates the three-dimensional model by an amount in accordance with the predetermined amount of time. The process of step S51 is executed, following step S50.

In step S51, the processor 81 generates a game image of the item select scene reflecting the process result from steps S44, S48 and S50 and displays the game image on the display 12. That is, when the process of step S44 is executed, the processor 81 generates a selection image so as to specify, in the item column, the wearable item that is now being worn after the change. In this case, the processor 81 generates a preview image based on the model of the player character 201 having the appearance of wearing the wearable item that is now being worn after the change. If the process of step S48 has been executed, the processor 81 generates a preview image based on one of the low-head-height-ratio model and the high-head-height-ratio model that corresponds to the form of the preview image after the change. If the process of step S50 has been executed, the processor 81 generates a preview image showing the model after being rotated by the process of step S50. Note that when a series (loop) of processes of step S42 to S51 is repeatedly executed, the process of step S51 is repeatedly executed at a rate of once per the predetermined amount of time. The process of step S42 is executed again, following step S51.

[4. Functions/Effects and Variations of Present Embodiment]

As described above, in the embodiment described above, the game program is configured to cause a computer of an information processing apparatus (e.g., the main body apparatus 2) to perform the following processes.

displaying a character based on a character model of a first type (e.g., the low-head-height-ratio model) in a first scene (e.g., the field scene) in a game (step S11, S14).

displaying the character based on a character model of a second type (e.g., the high-head-height-ratio model) different from the first type in a second scene (e.g., the battle scene or the event scene) different from the first scene in the game (step S21, S24 or step S31, S33).

In a third scene (e.g., the item select scene) in the game, in which the user is allowed to specify a wearable item for changing appearance of the character, the game program causes the computer to perform the following processes.

selecting a wearable item in response to a selection instruction based on an operation input by the user (step S44).

performing a first preview display in which a character is displayed based on the character model of the first type having the appearance of wearing the wearable item being selected (step S48, S51).

performing a second preview display in which the character is displayed based on the character model of the second type having the appearance of wearing the wearable item being selected (step S48, S51).

if a confirm instruction has been given based on an operation input by the user, the process of changing settings regarding appearance of the character so as to reflect the wearable item being selected on the appearance of the character in the first scene and the second scene (step S46).

With the configuration described above, where models of different types are used for a character, the appearance of the character can be changed in accordance with the item being worn. Moreover, since the preview is displayed for both of the two different character models, the user can check the appearance for both of the models.

With the configuration described above, "a character model (of the first type/the second type) having the appearance of wearing a wearable item" may be a single model or may include a plurality of models. For example, "a character model (of the first type/the second type) having the appearance of wearing a wearable item" may be a single model that includes the character and the wearable item, or may be composed of the model of the character (e.g., the model of the "basic part" described above) and the model of the wearable item. Therefore, with the configuration described above, "changing settings regarding appearance of the character" means both to change the entirety of the character model and to change a part of the character model (where the character model is composed of a plurality of models).

With the configuration described above, the process of changing settings is performed under the condition that a confirm instruction has been given in the third scene. Note that the process of changing settings may be performed at the time of switching to the first scene or at the time of switching to the second scene. For example, settings for the character model of the first type may be changed upon switching to the first scene, and settings for the character model of the second type may be changed upon switching to the second scene. For example, the information processing apparatus may change settings at a point in time when a further instruction is given by the user after the confirm instruction is given.

While two different character models are used with the configuration described above, the configuration described above may include an embodiment where three or more different character models are used. For example, in other embodiments, three different character models may be used, wherein the preview display may be performed at least for the two character models thereof while in the third scene.

Note that in the embodiment described above, the character model of the first type and the character model of the second type are three-dimensional models having different head-height ratios from each other. Now, the character model of the first type and the character model of the second type may be any models for rendering the same character in different forms. The character model of the first type and the character model of the second type may be any models that are sufficiently similar to each other for the user to recognize they are the same character. One of the two different models may be generated based on the other model (e.g., by processing the other model through a predetermined deformation, etc.), or may be generated independently of the other model.

In the embodiment described above, the character is a player character that is controlled by the user, the first scene is a scene in which the player character moves through the game field, and the second scene is a scene, switched from the first scene, in which a battle or a game event is performed by the player character. The character model of the first type is a model whose head-height ratio is lower than the character model of the second type. Thus, the character can be rendered with a detailed design in a scene in which a battle or a game event is performed while reducing the process load by using a model of a simple design in a scene in which the player character moves through the game field. In other embodiments, there is no limitation on the first and second scenes, and there is no limitation on the forms of the character models of the first and second types used in different scenes.

Note that in the embodiment described above, while the player character 201 moves in accordance with an operation by the user in the field scene (step S13), the player character 201 performs an action that is not based on an operation by the user in the battle scene or the event scene (step S23, S32). That is, in the embodiment described above, the information processing apparatus moves the character through the game field based on an operation input by the user in the first scene, and causes the character to perform a predetermined action based on an operation input by the user in the second scene. Thus, it can be said that the first scene is a scene in which the character performs relatively simple actions, and the second scene is a scene in which the character may perform more complicated actions. In the embodiment described above, in such a second scene, by using a model having a higher head-height ratio than the model used in the first scene, it is possible to show the user complicated actions of the character in the second scene in an easy-to-understand manner. Thus, it is possible to better render stage effects in the second scene.

Note that in other embodiments, the game system does not need to include one or more of the components of the embodiment described above and does not need to execute one or more of the processes that are executed in the embodiment described above. For example, in order to realize a specific one of the advantageous effects of the embodiment described above, the game system may include a component or components for realizing the specific advantageous effect and execute a process or processes for realizing the specific advantageous effect, and the game system does not need to include other components and does not need to execute other processes.

The embodiment described above can be used as, for example, a game system or a game program, with the aim of, where models of different types are used for a character, changing the appearance of the character in accordance with the item worn by the character, for example.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium storing a game program, the game program, when executed, causing a computer of an information processing apparatus to provide execution comprising:
   displaying a character based on a character model of a first type in a first scene in a game;
   displaying the character based on a character model of a second type different from the first type in a second scene different from the first scene in the game;
   in a third scene in the game, in which a user is allowed to specify a wearable item for changing appearance of the character, selecting the wearable item in response to a selection instruction based on an operation input by the user;
   performing a first preview display in which the character is displayed based on the character model of the first type, associated with the first scene in the game, having the appearance of wearing the wearable item being selected;
   performing a second preview display in which the character is displayed based on the character model of the second type, associated with the second scene in the game, having the appearance of wearing the wearable item being selected; and
   in association with a confirm instruction having been given based on an operation input by the user, changing settings regarding appearance of the character so as to reflect the wearable item being selected on the appearance of the character in the first scene and the second scene.

2. The non-transitory storage medium according to claim 1, wherein the character model of the first type and the character model of the second type include three-dimensional models having different head-height ratios from each other.

3. The non-transitory storage medium according to claim 2, wherein:
   the character is a player character that is controlled by the user;
   the first scene is a scene in which the character moves through a game field;
   the second scene is a scene, switched from the first scene, in which a battle or an event is performed by the character; and
   the character model of the first type has a lower head-height ratio than the character model of the second type.

4. The non-transitory storage medium according to claim 3, wherein the game program causes the computer to provide execution comprising:
   controlling movement of the character through the game field based on an operation input by the user in the first scene; and
   controlling a predetermined action of the character not based on an operation input by the user in the second scene.

5. The non-transitory storage medium according to claim 1, wherein the wearable item includes a clothing item or an armor item to be worn by the character.

6. The non-transitory storage medium according to claim 1, wherein the game program causes the computer to provide execution comprising:
   switching between the first preview display and the second preview display in response to a switch instruction based on an operation input by the user in the third scene.

7. The non-transitory storage medium according to claim 1, wherein the third scene includes a scene in which the user selects a wearable item to be purchased and obtained by the character in the game, or a scene in which the user selects a wearable item to be worn by the character from among wearable items that have been obtained by the character.

8. The non-transitory storage medium according to claim 1, wherein the game program causes the computer to provide execution comprising:
   in the third scene, displaying the character, which is displayed based on a character model of the first type in the first preview display, or displaying the character, which is displayed based on a character model of the second type in the second preview display, while applying at least one of: moving, rotating, and enlarging/shrinking, in response to an operation input from the user.

9. An information processing apparatus, comprising:
   a display; and
   processing circuitry including at least a processor, wherein the processing circuitry is configured to:
      display a character based on a character model of a first type in a first scene in a game;
      displaying the character based on a character model of a second type different from the first type in a second scene different from the first scene in the game;
      in a third scene in the game, in which a user is allowed to specify a wearable item for changing appearance of the character, select the wearable item in response to a selection instruction based on an operation input by the user;
      perform a first preview display in which the character is displayed based on the character model of the first type, associated with the first scene in the game, having the appearance of wearing the wearable item being selected;
      perform a second preview display in which the character is displayed based on the character model of the second type, associated with the second scene in the game, having the appearance of wearing the wearable item being selected; and
      in association with a confirm instruction having been given based on an operation input by the user, change settings regarding appearance of the character so as to reflect the wearable item being selected on the appearance of the character in the first scene and the second scene.

10. The information processing apparatus according to claim 9, wherein:
the character model of the first type and the character model of the second type include three-dimensional models having different head-height ratios from each other,
the character is a player character that is controlled by the user;
the first scene is a scene in which the character moves through a game field;
the second scene is a scene, switched from the first scene, in which a battle or an event is performed by the character; and
the character model of the first type has a lower head-height ratio than the character model of the second type.

11. The information processing apparatus according to claim 10, wherein the processing circuitry is configured to:
control movement of the character through the game field based on an operation input by the user in the first scene; and
control a predetermined action of the character not based on an operation input by the user in the second scene.

12. The information processing apparatus according to claim 9, wherein the wearable item includes a clothing item or an armor item to be worn by the character.

13. The information processing apparatus according to claim 9, wherein the processing circuitry is configured to switch between the first preview display and the second preview display in response to a switch instruction based on an operation input by the user in the third scene.

14. The information processing apparatus according to claim 9, wherein the third scene includes a scene in which the user selects a wearable item to be purchased and obtained by the character in the game, or a scene in which the user selects a wearable item to be worn by the character from among wearable items that have been obtained by the character.

15. The information processing apparatus according to claim 9, wherein the processing circuitry is configured to perform in the third scene, displaying the character, which is displayed based on a character model of the first type in the first preview display, or displaying the character, which is displayed based on a character model of the second type in the second preview display, while applying at least one of: moving, rotating, and enlarging/shrinking, in response to an operation input from the user.

16. An information processing system, comprising:
a processor; and
a memory configured to store computer readable instructions that, when executed by the processor, cause the information processing system to:
display a character based on a character model of a first type in a first scene in a game;
display the character based on a character model of a second type different from the first type in a second scene different from the first scene in the game;
in a third scene in the game, in which a user is allowed to specify a wearable item for changing appearance of the character, select the wearable item in response to a selection instruction based on an operation input by the user;
perform a first preview display in which the character is displayed based on the character model of the first type, associated with the first scene in the game, having the appearance of wearing the wearable item being selected;
perform a second preview display in which the character is displayed based on the character model of the second type, associated with the second scene in the game, having the appearance of wearing the wearable item being selected; and
in association with a confirm instruction having been given based on an operation input by the user, change settings regarding appearance of the character so as to reflect the wearable item being selected on the appearance of the character in the first scene and the second scene.

17. The information processing system according to claim 16, wherein the character model of the first type and the character model of the second type include three-dimensional models having different head-height ratios from each other.

18. The information processing system according to claim 17, wherein:
the character is a player character that is controlled by the user;
the first scene is a scene in which the character moves through a game field;
the second scene is a scene, switched from the first scene, in which a battle or an event is performed by the character, and
the character model of the first type has a lower head-height ratio than the character model of the second type.

19. The information processing system according to claim 18, wherein the information processing system is further caused to:
control movement of the character through the game field based on an operation input by the user in the first scene; and
control a predetermined action of the character not based on an operation input by the user in the second scene.

20. The information processing system according to claim 16, wherein the wearable item includes a clothing item or an armor item to be worn by the character.

21. The information processing system according to claim 16, wherein the information processing system is further caused to perform switching between the first preview display and the second preview display in response to a switch instruction based on an operation input by the user in the third scene.

22. The information processing system according to claim 16, wherein the third scene includes a scene in which the user selects a wearable item to be purchased and obtained by the character in the game, or a scene in which the user selects a wearable item to be worn by the character from among wearable items that have been obtained by the character.

23. The information processing system according to claim 16, wherein the information processing system is further caused to perform in the third scene, displaying the character, which is displayed based on a character model of the first type in the first preview display, or displaying the character, which is displayed based on a character model of the second type in the second preview display, while applying at least one of: moving, rotating, and enlarging/shrinking, in response to an operation input from the user.

24. A game processing method, comprising:
displaying a character based on a character model of a first type in a first scene in a game;
displaying the character based on a character model of a second type different from the first type in a second scene different from the first scene in the game;

in a third scene in the game, in which a user is allowed to specify a wearable item for changing appearance of the character, selecting the wearable item in response to a selection instruction based on an operation input by the user;

performing a first preview display in which the character is displayed based on the character model of the first type, associated with the first scene in the game, having the appearance of wearing the wearable item being selected;

performing a second preview display in which the character is displayed based on the character model of the second type, associated with the second scene in the game, having the appearance of wearing the wearable item being selected; and in association with a confirm instruction having been given based on an operation input by the user, changing settings regarding appearance of the character so as to reflect the wearable item being selected on the appearance of the character in the first scene and the second scene.

25. The game processing method according to claim 24, wherein the character model of the first type and the character model of the second type include three-dimensional models having different head-height ratios from each other.

26. The game processing method according to claim 25, wherein:
the character is a player character that is controlled by the user;
the first scene is a scene in which the character moves through a game field,
the second scene is a scene, switched from the first scene, in which a battle or an event is performed by the character, and
the character model of the first type has a lower head-height ratio than the character model of the second type.

27. The game processing method according to claim 26, further comprising:
controlling movement of the character through the game field based on an operation input by the user in the first scene; and
controlling a predetermined action of the character not based on an operation input by the user in the second scene.

28. The game processing method according to claim 24, wherein the wearable item includes a clothing item or an armor item to be worn by the character.

29. The game processing method according to claim 24, further comprising performing switching between the first preview display and the second preview display in response to a switch instruction based on an operation input by the user in the third scene.

30. The game processing method according to claim 24, wherein the third scene includes a scene in which the user selects a wearable item to be purchased and obtained by the character in the game, or a scene in which the user selects a wearable item to be worn by the character from among wearable items that have been obtained by the character.

31. The game processing method according to claim 24, further comprising performing in the third scene, displaying the character, which is displayed based on a character model of the first type in the first preview display, or displaying the character, which is displayed based on a character model of the second type in the second preview display, while applying at least one of: moving, rotating, and enlarging/shrinking, in response to an operation input from the user.

32. The non-transitory storage medium according to claim 1, wherein
the character model of the first type is displayed with a first head-height ratio in the first scene in the game, and
the character model of the second type is displayed with a second head-height ratio in the second scene in the game.

* * * * *